United States Patent
Yu et al.

(10) Patent No.: US 9,571,658 B2
(45) Date of Patent: Feb. 14, 2017

(54) METHOD OF CALL FORWARDING BETWEEN DEVICES

(71) Applicant: Samsung Electronics Co., Ltd., Gyeonggi-do (KR)

(72) Inventors: Yong Ju Yu, Seoul (KR); Sung Sik Yoo, Gyeonggi-do (KR); Yoo Kyung Koh, Gyeonggi-do (KR); Yun Jeong Ko, Chungcheongnam-do (KR); Seul A Kim, Seoul (KR); Myung Hwan Lee, Seoul (KR); Ji Ho Lee, Seoul (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 0 days.

(21) Appl. No.: 14/663,623

(22) Filed: Mar. 20, 2015

(65) Prior Publication Data
US 2015/0271340 A1 Sep. 24, 2015

(30) Foreign Application Priority Data

Mar. 20, 2014 (KR) .................. 10-2014-0033052
Aug. 25, 2014 (KR) .................. 10-2014-0111107

(51) Int. Cl.
*H04M 3/42* (2006.01)
*H04M 3/54* (2006.01)
*H04W 4/16* (2009.01)

(52) U.S. Cl.
CPC .............. *H04M 3/543* (2013.01); *H04W 4/16* (2013.01)

(58) Field of Classification Search
CPC ............................... H04M 3/42; H04M 3/543

USPC ........................................................ 455/417
See application file for complete search history.

(56) References Cited

U.S. PATENT DOCUMENTS

| 8,423,006 | B2* | 4/2013 | Choi ................... | H04M 1/6075 |
|---|---|---|---|---|
| | | | | 455/414.1 |
| 8,902,315 | B2 | 12/2014 | Fisher et al. | |
| 2004/0203351 | A1* | 10/2004 | Shearer ............... | H04M 1/6066 |
| | | | | 455/41.1 |
| 2006/0026288 | A1* | 2/2006 | Acharya ................ | G06Q 10/10 |
| | | | | 709/227 |
| 2007/0135187 | A1* | 6/2007 | Kreiner ................. | H04M 1/271 |
| | | | | 455/575.2 |
| 2010/0245585 | A1 | 9/2010 | Fisher et al. | |
| 2011/0313922 | A1* | 12/2011 | Ben Ayed ............ | G06Q 20/108 |
| | | | | 705/42 |

(Continued)

FOREIGN PATENT DOCUMENTS

| CN | 101087154 A | 12/2007 |
|---|---|---|
| KR | 2003-0069727 A | 8/2003 |
| KR | 10-2010-0130478 A | 12/2010 |

*Primary Examiner* — Qutbuddin Ghulamali
(74) *Attorney, Agent, or Firm* — Cha & Reiter, LLC

(57) ABSTRACT

An electronic device and method are disclosed, including a first communication module configured to perform a cellular communication, a second communication module configured to perform a communication to connect the electronic device to an external electronic device, and at least one processor electrically connected to the first and second communication modules, executing the method, which includes activating the first communication module in response to detecting a preset condition, and transmitting a signal requesting call forwarding via the first communication module.

20 Claims, 17 Drawing Sheets

(56) References Cited

U.S. PATENT DOCUMENTS

2015/0260989 A1\* 9/2015 Rahman ............... G02B 27/017
345/8

\* cited by examiner

METHOD OF CALL FORWARDING BETWEEN DEVICES

CROSS-REFERENCE TO RELATED APPLICATION

This application claims priority to Korean patent applications No. 10-2014-0033052 filed on Mar. 20, 2014, and No. 10-2014-0111107 filed on Aug. 25, 2014, the disclosures of both being hereby incorporated by reference in their entirety.

TECHNICAL FIELD

The present disclosure relates to a method and system for call forwarding between electronic devices.

BACKGROUND

A call forwarding service enables an incoming call or a received message to be forwarded to another electronic device that a user has specified in advance, allowing the user to receive it via the designated electronic device. In some cases, the user's pre-specified electronic device may be owned by another user.

A "One Person Multi Device" (OPMD) environment involves one user utilizing several devices, such as wired and wireless telephones in the home, computers, laptops, portable smart phones, and smart pads.

Implementing the above-described call forwarding may thus provide convenience to a user in the OPMD environment.

SUMMARY

Various embodiments of the present disclosure are directed to call and/or a message forwarding between a plurality of electronic devices, and providing the same for each of the electronic devices.

In one embodiment of the present disclosure, an electronic device is disclosed including a first communication module configured to perform cellular communication, a second communication module configured to communicatively connect the electronic device to an external electronic device, and at least one processor electrically connected to the first and second communication modules. The processor activates the first communication module in response to detecting a preset condition, and transmits, via the first communication module, a signal requesting call forwarding with the external electronic device.

In one embodiment of the present disclosure, an electronic device is disclosed including a first communication module configured to perform cellular communication, a second communication module configured to perform a communicatively connect the electronic device to an external electronic device, and at least one processor electrically connected to the first and second communication modules, and configured to: if the electronic device is communicatively electrically connected to the external electronic device, receive, via the first communication module, a voice call signal or message from a communication carrier.

In one embodiment of the present disclosure, a call forwarding method for an electronic device is disclosed, including detecting a preset condition including at least one of disconnection of the electronic device with an external electronic device, and connection between the electronic device with an electronic management server; and in response to detecting a preset condition, transmitting a signal requesting call forwarding to a communication carrier.

DETAILED DESCRIPTION

Figure 1:
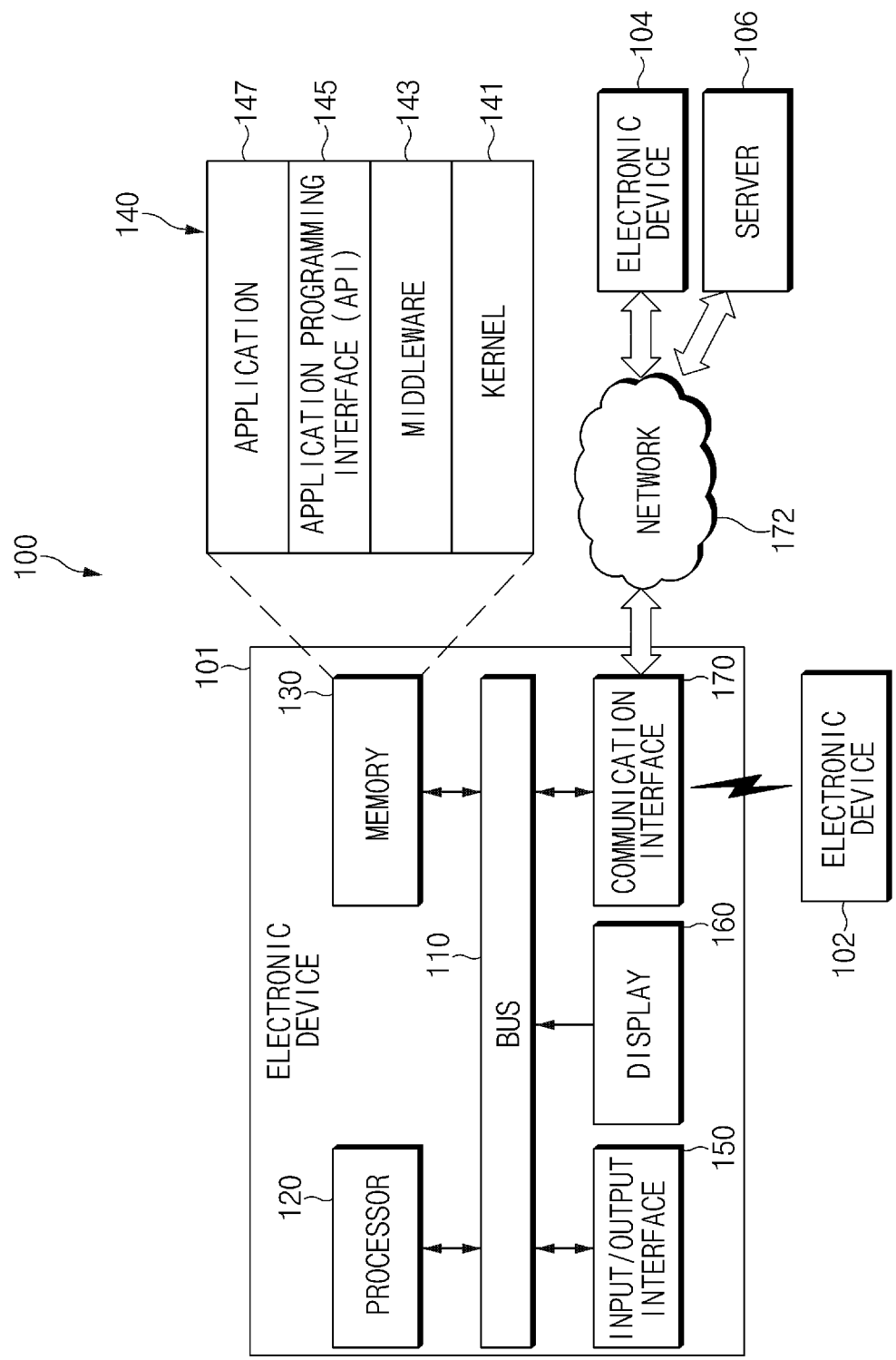
FIG. 1 is a block diagram illustrating an electronic device in a network environment according to various embodiments of the present disclosure.

Hereinafter, various embodiments of the present disclosure are disclosed with reference to the accompanying drawings. Thus, it should be understood that the present disclosure is not limited to specific embodiments and covers the various modifications, equivalents and/or alternatives of the present disclosure. With respect to the descriptions of the drawings, like reference numerals refer to like elements.

In various embodiments of the present disclosure, expression "include", "may include", "comprise", or "may comprise" indicates the presence of a corresponding feature (for example, numerical values, functions, operations, and components such as parts) and does not exclude the presence of an additional feature.

In various embodiments of the present disclosure, expression "A or B", "at least one of A or/and B", or "one or more of A or/and B" may include all possible combinations of items listed together. For example, "A or B", "at least one of A and B", or "at least one of A or B" may refer to all (1) including at least one A, (2) including at least one B, or (3) including at least one "A and at least one B.

Expressions such as "1st", "2nd", "first", "second", and the like used herein may refer to modifying various different elements of various embodiments regardless of the order and priority, but do not limit the elements. The expressions may be used to distinguish one element from another element. For instance, "a first user device" and "a second user device" indicate different user devices regardless of the order or importance. For example, a first component may be referred to as a second component and vice versa without departing from the scope of the present disclosure.

In various embodiments of the present disclosure, it will be understood that when a component (for example, a first component) is referred to as being "(operatively or communicatively) coupled with/to" or "connected to" another component (for example, a second component), the component can be directly connected to the other component or connected through another component (for example, a third component). In various embodiments of the present disclosure, it will be understood that when a component (for example, a first component) is referred to as being "directly connected to" or "directly access" another component (for example, a second component), another component (for example, a third component) does not exist between the component (for example, the first component) and the other component (for example, the second component).

Expression "configured to" used in various embodiments of the present disclosure may be interchangeably used with "suitable for", "having the capacity to", "designed to", "adapted to", "made to", or "capable of" according to a situation, for example. The term "configured to" may not necessarily mean "specifically designed to" in terms of hardware. Instead, expression "a device configured to" in some situations may mean that the device and another device or part are "capable of". For example, "a processor configured (or set) to perform A, B, and C" in a phrase may mean a dedicated processor (for example, an embedded processor) for performing a corresponding operation or a generic-purpose processor (for example, a CPU or application processor) for performing corresponding operations by executing at least one software program stored in a memory device.

Terms used in various embodiments of the present disclosure are used to describe specific embodiments, and are not intended to limit the scope of other embodiments. The terms of a singular form may include plural forms unless they have a clearly different meaning in the context. Unless otherwise defined herein, all the terms used herein, which include technical or scientific terms, may have the same meaning that is generally understood by a person skilled in the art. In general, the terms defined in the dictionary should be considered to have the same or similar meaning as the contextual meaning of the related art, and, unless clearly defined herein, should not be understood abnormally or as having an excessively formal meaning. In any cases, even the terms defined in this specification cannot be interpreted as excluding embodiments of the present disclosure.

An electronic device according to various embodiments of the present disclosure may be an electronic device supporting call forwarding service to be described with reference to FIGS. 1 to 11. For instance, electronic devices may include at least one of smartphones, tablet personal computers (PCs), mobile phones, video phones, electronic book (e-book) readers, desktop PCs, laptop PCs, netbook computers, workstations, servers, personal digital assistants (PDAs), portable multimedia player (PMPs), MP3 players, mobile medical devices, cameras, and wearable devices (for example, smart glasses, head-mounted-devices (HMDs), electronic garments, electronic bracelets, electronic necklaces, electronic appcessories, electronic tattoos, smart mirrors, and a smart watches).

In various embodiments of the present disclosure, an electronic device may be a smart home appliance supporting call forwarding service. The smart home appliances may include at least one of, for example, televisions, digital video disk (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™ or Google TV™), game consoles (for example, Xbox™ and PlayStation™), electronic dictionaries, electronic keys, camcorders, and electronic picture frames.

According to some embodiments, an electronic device may include at least one of various medical devices supporting call forwarding service (for example, various portable measurement devices (for example, glucometers, heart rate meters, blood pressure meters, temperature meters, etc.), magnetic resonance angiography (MRA) devices, magnetic resonance imaging (MRI) devices, computed tomography (CT) devices, medical imaging devices, ultrasonic devices, etc.), navigation devices, global positioning system (GPS) receivers, event data recorders (EDRs), flight data recorders (FDRs), vehicle infotainment devices, marine electronic equipment (for example, marine navigation systems, gyro compasses, etc.), avionics, security equipment, vehicle head units, industrial or household robots, financial institutions' automatic teller's machines (ATMs), stores' point of sales (POS) or internet of things (for example, bulbs, various sensors, electric or gas meters, sprinkler systems, fire alarms, thermostats, street lights, toasters, exercise equipment, hot water tanks, heaters, boilers, etc.).

In various embodiments of the present disclosure, an electronic device may include at least one of part of furniture or buildings/structures supporting call forwarding service, electronic boards, electronic signature receiving devices, projectors, and various measuring instruments (for example, water, electricity, gas, or radio signal measuring instruments). In various embodiments of the present disclosure, an electronic device may be one of the above-mentioned various devices or a combination thereof.

In various embodiments of the present disclosure, an electronic device may be a flexible electronic device supporting call forwarding service.

Additionally, an electronic device according to various embodiments of the present disclosure is not limited to the above-mentioned devices and may include a new kind of an electronic device according to the technology development.

Hereinafter, an electronic device according to various embodiments of the present disclosure will be described in more detail with reference to the accompanying drawings. In this specification, the term "user" may refer to a person using an electronic device or a device using an electronic device (for example, an artificial intelligent electronic device).

Hereinafter, an electronic device according to various embodiments will be described in more detail with reference to FIGS. 1 to 11. The term "user" in various embodiments may refer to a person using an electronic device or a device using an electronic device (for example, an artificial intelligent electronic device).

FIG. 1 is a view illustrating an electronic device in network environment according to various embodiments of the present disclosure.

The electronic device 101 may include a bus 110, a processor 120, a memory 130, an input/output interface 150, a display 160, and a communication interface 170. In various embodiments of the present disclosure, the electronic device 101 may omit at least one of the components or may further include another component.

The bus 110, for example, may include a circuit connecting the components 110 to 170 and delivering communication signals (for example, a control message and/or data) therebetween.

The processor 120 may include one or more of a central processing unit (CPU), an application processor (AP), or a communication processor (CP). The processor 120, for example, may perform an operation or data processing on control and/or communication of at least another component of the electronic device 101.

The memory 130 may include volatile and/or nonvolatile memory. The memory 130, for example, may store commands or data relating to at least another component of the electronic device 101. According to an embodiment, the memory 130 may store software and/or a program 140. The program 140, for example, may include a kernel 141, middleware 143, an application programming interface (API) 145, and/or an application program (or "application") 147. At least part of the kernel 141, the middleware 143, or the API 145 may be called operating system (OS).

The kernel 141 may control or manage system resources (for example, the bus 110, the processor 120, or the memory 130) used for performing operations or functions implemented by the other programs (for example, the middleware 134, the API 145, or the application program 147). Additionally, the kernel 141 may provide an interface for controlling or managing system resources by accessing an individual component of the electronic device 101 from the middleware 143, the API 145, or the application program 147.

The middleware 143, for example, may serve as an intermediary role for exchanging data between the API 145 or the application program 147 and the kernel 141 through communication. Additionally, in relation to job requests received from the application program 147, the middleware 143 may perform a control (for example, scheduling or load balancing) for the job requests by using a method of assigning a priority for using a system resource (for example, the bus 110, the processor 120, or the memory 130) of the electronic device 101 to at least one application among the application programs 147.

The API 145, as an interface through which the application 147 controls a function provided from the kernel 141 or the middleware 143, for example, may include at least one interface or function (for example, an instruction) for file control, window control, image processing, or character control.

The input/output interface 150, for example, may serve as the role of an interface for delivering commands or data inputted from a user or another external device to another component(s) of the electronic device 101. Additionally, the input/output interface 150 may output commands or data inputted from another component(s) of the electronic device 101 to a user or another external device.

The display 160, for example, may include a liquid crystal display (LCD), a light emitting diode (LED) display, an organic light emitting diode (OLED) display, a microelectromechanical systems (MEMS) display, or an electronic paper display. The display 160, for example, may display various contents (for example, Texts, images, videos, icons, or symbols) to a user. The display 160 may include a touch screen, for example, and receive touch, gesture, proximity, or hovering inputs by using an electronic pen or a user's body part.

The communication interface 170, for example, may set a communication between the electronic device 101 and an external device (for example, a first external electronic device 102, a second external electronic device 104, or a server 106). For example, the communication interface 170 may communicate with the external device (for example, the second external electronic device 104 or the server 106) in connection to the network 172 through wireless communication or wired communication.

The wireless communication, for example, may use at least one of LTE, LTE-A, CDMA, WCDMA, UMTS, WiBro, or GSM, as a cellular communication protocol. The wired communication, for example, may include at least one of universal serial bus (USB), high definition multimedia interface (HDMI), recommended standard 232 (RS-232), and plain old telephone service (POTS). The network 172 may include at least one of telecommunications networks such as computer network (for example, LAN or WAN), internet, and telephone network.

Each of the first and second external electronic devices 102 and 104 may be the same or different type of the electronic device 101. According to an embodiment, the server 106 may include a group of one or more servers. According to various embodiments, all or part of operations executed in the electronic device 101 may be executed by another or a plurality of electronic devices (for example, the electronic device 102 or 104 or the server 106). According to an embodiment, when the electronic device 101 is utilized to perform a function or service automatically or at the request, instead of performing the function or service by the electronic device 101 or additionally, the electronic device 101 may request at least part of a function relating thereto from another device (for example, the electronic device 102 or 104, or the server 106). The other electronic device (for example, the electronic device 102 or 104, or the server 106) may perform the requested function or an additional function and may deliver its result to the electronic device 101. The electronic device 101 may provide the requested function or service by processing the received result as it is or additionally. For this, for example, cloud computing, distributed computing, or client-server computing techniques may be used.

For example, in the description for FIG. 1, the electronic device 101 may include the bus 110, the processor 120, the memory 130, the input/output interface 150, the display 160, and the communication interface 170. The communication interface 170 may include a first communication module for performing cellular communication and data communication and a second communication module communicable with an external device. Additionally, on the basis of a specified condition, the processor 120 may support a service for transmitting a signal for requesting call forwarding to the outside by using one communication module, for example, the first communication module.

Figure 2:
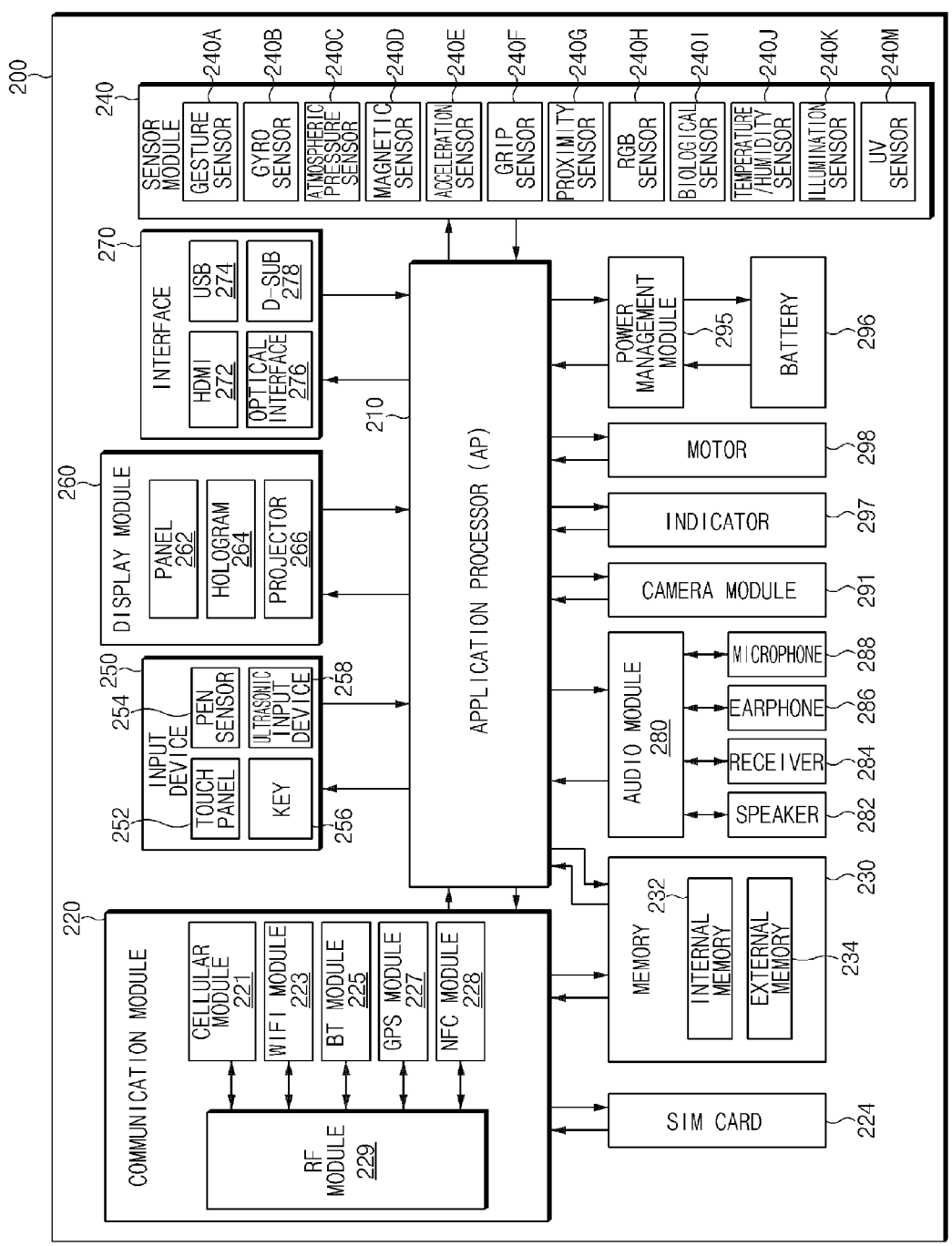
FIG. 2 is a block diagram of an electronic device according to various embodiments of the present disclosure.

FIG. 2 is a block diagram of an electronic device 200 according to various embodiments of the present disclosure. The electronic device 200, for example, may include all or part of the above-mentioned electronic device 101 shown in FIG. 1. The electronic device may include at least one application processor (AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210, for example, may control a plurality of hardware or software components connected to the AP 210 and also may perform various data processing and operations by executing an operating system or an application program. The AP 210 may be implemented with a system on chip (SoC), for example. According to an embodiment, the AP 210 may further include a graphic processing unit (GPU) and/or an image signal processor. The AP 210 may include at least part (for example, a cellular module 221) of the components shown in FIG. 2. The AP 210 may load commands or data received from at least of other components (for example, nonvolatile memory) into volatile memory and process them and may store various data in a nonvolatile memory.

The communication module 220 may have the same or similar configuration to the communication interface 170 of FIG. 1. The communication module 220, for example, may include a cellular module 221, a WiFi module 223, a BT module 225, a GPS module 227, an NFC module 228, and a radio frequency (RF) module 229.

The cellular module 221, for example, may provide voice call, video call, SMS, or internet service through a communication network. According to an embodiment, the cellular module 221 may identify and authenticate an electronic device in a communication network by using a subscriber identification module (for example, the SIM card 224). According to an embodiment, the cellular module 221 may perform at least part of a function that the AP 210 provides. According to an embodiment, the cellular module 221 may further include a communication processor (CP).

Each of the WiFi module 223, the BT module 225, the GPS module 227, and the NFC module 228 may include a processor for processing data transmitted/received through a corresponding module. According to various embodiments of the present disclosure, at least part (for example, more than two) of the cellular module 221, the WiFi module 223, the BT module 225, the GPS module 227, and the NFC module 228 may be included in one integrated chip (IC) or an IC package.

The RF module 229, for example, may transmit/receive a communication signal (for example, an RF signal). The RF module 229, for example, may include a transceiver, a power amp module (PAM), a frequency filter, a low noise amplifier (LNA), or an antenna. According to another embodiment, at least one of the cellular module 221, the WiFi module 223, the BT module 225, the GPS module 227, and the NFC module 228 may transmit/receive an RF signal through an additional RF module.

The SIM card 224, for example, may include a card including a subscriber identification module and/or an embedded SIM and also may include unique identification information (for example, an integrated circuit card identifier (ICCID)) or subscriber information (for example, an international mobile subscriber identity (IMSI)).

The memory 230 (for example, the memory 130) may include an internal memory 232 or an external memory 234. The internal memory 232, for example, may include at least one of a volatile memory (for example, dynamic RAM (DRAM), static RAM (SRAM), synchronous dynamic RAM (SDRAM)), and non-volatile memory (for example, one time programmable ROM (OTPROM), programmable ROM (PROM), erasable and programmable ROM (EPROM), electrically erasable and programmable ROM (EEPROM), mask ROM, flash ROM, flash memory (for example, NAND flash memory and NOR flash memory), hard drive, and solid state drive (SSD)).

The external memory 234 may further include flash drive, for example, compact flash (CF), secure digital (SD), micro SD, mini SD, extreme digital (xD), or memorystick. The external memory 234 may be functionally and/or physically connected to the electronic device through various interfaces.

The sensor module 240, for example, measures physical quantities or detects an operating state of the electronic device, thereby converting the measured or detected information into electrical signals. The sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biological sensor 240I, a temperature/humidity sensor 240J, an illumination sensor 240K, and an ultra violet (UV) sensor 240M. Additionally/alternately, the sensor module 240 may include an E-nose sensor, an electromyography (EMG) sensor, an electroencephalogram (EEG) sensor, an electrocardiogram (ECG) sensor, an infra red (IR) sensor, an iris sensor, and/or a fingerprint sensor. The sensor module 240 may further include a control circuit for controlling at least one sensor therein. In various embodiments of the present disclosure, the electronic device, as part of at least the AP 210, may further include a processor configured to control the sensor module 240 and while the AP 210 is in a sleep state, may control the sensor module 240.

The input device 250, for example, may include a touch panel 252, a (digital) pen sensor 254, a key 256, or an ultrasonic input device 258. The touch panel 252, for example, may use at least one of capacitive, resistive, infrared, and ultrasonic methods. Additionally, the touch panel 252 may further include a control circuit. The touch panel 252 may further include a tactile layer to provide a tactile response to a user.

The (digital) pen sensor 254, for example, may include a sheet for recognition that is part of a touch panel or additional. The key 256 may include a physical button, a touch key, an optical key, or a keypad, for example. The ultrasonic input device 258 may detect ultrasonic waves through a microphone (for example, a microphone 288) to check data corresponding to the detected ultrasonic waves.

The display 260 (for example, the display 160) may include a panel 262, a hologram device 264, or a projector 266. The panel 262 may include the same or similar configuration to the display 160 of FIG. 1. The panel 262 may be implemented to be flexible, transparent, or wearable, for example. The panel 262 and the touch panel 252 may be configured with one module. The hologram 264 may show three-dimensional images in the air by using the interference of light. The projector 266 may display an image by projecting light on a screen. The screen, for example, may be placed inside or outside the electronic device. According to an embodiment, the display 260 may further include a control circuit for controlling the panel 262, the hologram device 264, or the projector 266.

The interface 270 may include a high-definition multimedia interface (HDMI) 272, a universal serial bus (USB) 274, an optical interface 276, or a D-subminiature (sub) 278, for example. The interface 270 may be included in the communication interface 170 shown in FIG. 1, for example. Additionally/alternately, the interface 270 may include a mobile high-definition link (MHL) interface, a secure Digital (SD) card/multi-media card (MMC) interface, or an infrared data association (IrDA) standard interface.

The audio module 280, for example, may convert sound into electrical signals and convert electrical signals into sounds. At least some components of the audio module 280 may be included in the input/output interface 150 shown in FIG. 1, for example. The audio module 280 may process sound information inputted/outputted through a speaker 282, a receiver 284, an earphone 286, or the microphone 288.

The camera module 291, as a device for capturing a still image and a video, may include at least one image sensor (for example, a front sensor or a rear sensor), a lens, an image signal processor (ISP), or a flash (for example, an LED or a xenon lamp).

The power management module 295, for example, may manage the power of the electronic device. According to an embodiment, the power management module 295 may include a power management IC (PMIC), a charger IC, or a battery or fuel gauge, for example. The PMIC may have a wired and/or wireless charging method. The wireless charging method, for example, may include a magnetic resonance method, a magnetic induction method, or an electromagnetic method and may further include an additional circuit for wireless charging, for example, a coil loop, a resonant circuit, or a rectifier circuit. The battery gauge may measure the remaining amount of the battery 296, or a voltage, current, or temperature of the battery 296 during charging. The battery 296, for example, may include a rechargeable battery and/or a solar battery.

The indicator 297 may display a specific state of the electronic device or part thereof (for example, the AP 210), for example, a booting state, a message state, or a charging state. The motor 298 may convert electrical signals into mechanical vibration and may generate a vibration or haptic effect. Although not shown in the drawings, the electronic device may include a processing device (for example, a GPU) for mobile TV support. A processing device for mobile TV support may process media data according to the standards such as digital multimedia broadcasting (DMB), digital video broadcasting (DVB), or media flow.

Each of the above-mentioned components of the electronic device may be configured with at least one component and the name of a corresponding component may vary according to the kind of an electronic device. In various embodiments, an electronic device may be configured including at least one of the above-mentioned components or another component, or not including some of the above-mentioned components. Additionally, some of components in an electronic device according to various embodiments of the present disclosure are configured as one entity, so that functions of previous corresponding components are performed identically.

Figure 3:
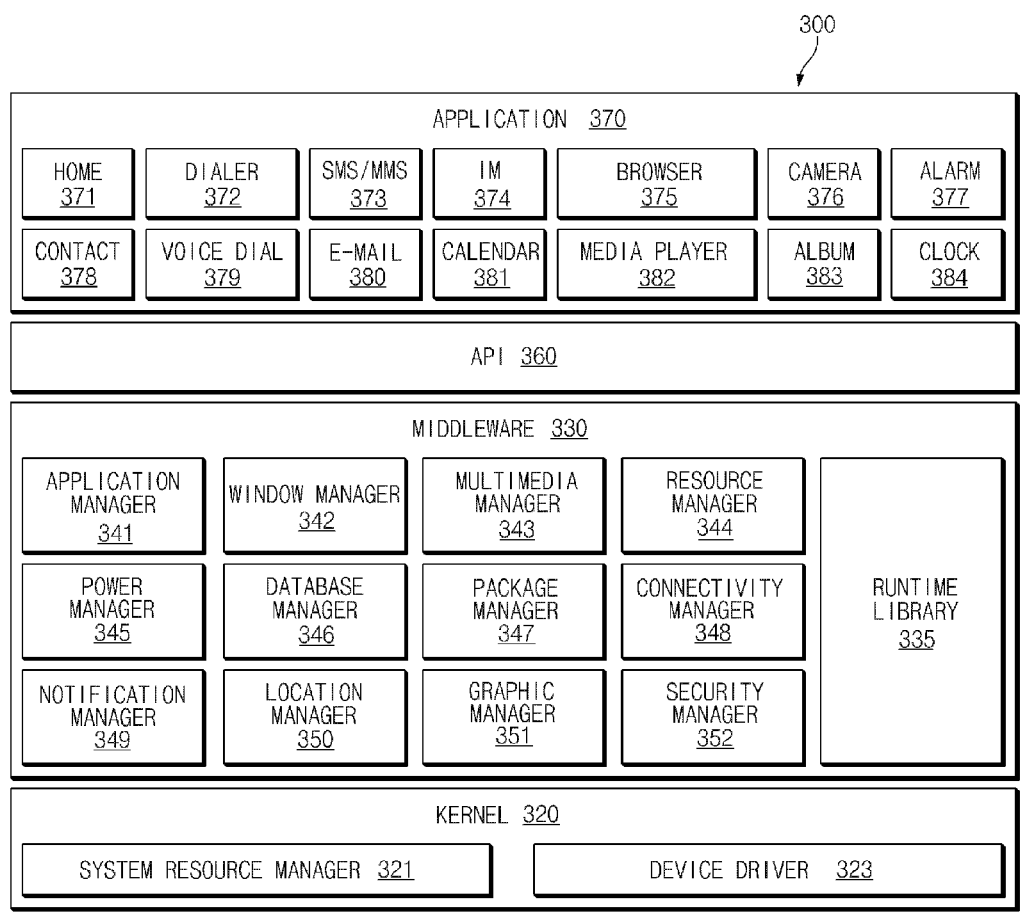
FIG. 3 is a block diagram of a program module according to various embodiments of the present disclosure.

FIG. 3 is a block diagram 300 illustrating a program module 310 according to various embodiments of the present disclosure. According to an embodiment, the program module 310 (for example, the program 140) may include an operating system (OS) for controlling a resource relating to an electronic device (for example, the electronic device 101) and/or various applications (for example, the application program 147) running on the OS. The OS, for example, may include android, iOS, windows, symbian, tizen, or bada.

The program module 310 may include a kernel 320, a middleware 33, an application programming interface (API) 360, and/or an application 370. At least part of the program module 310 may be preloaded on an electronic device or may be downloaded from a server (for example, 106).

The kernel 320 (for example, the kernel 141 of FIG. 1), for example, may include a system resource manager 321, or a device driver 323. The system resource manager 321 may perform the control, allocation, or retrieval of a system resource. According to an embodiment, the system resource manager 321 may include a process management unit, a memory management unit, or a file system management unit. The device driver 323, for example, a display driver, a camera driver, a Bluetooth driver, a sharing memory driver, a USB driver, a keypad driver, a WiFi driver, an audio driver, or an inter-process communication (IPC) driver.

The middleware 330, for example, may provide a function that the application 370 utilizes commonly, or may provide various functions to the application 370 through the API 360 in order to allow the application 370 to efficiently use a limited system resource inside the electronic device. According to an embodiment, the middleware 330 (for example, the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335, for example, may include a library module that a complier uses to add a new function through a programming language while the application 370 is running. The runtime library 335 may perform a function on input/output management, memory management, or an arithmetic function.

The application manager 341, for example, may mange the life cycle of at least one application among the applications 370. The window manager 342 may manage a GUI resource used in a screen. The multimedia manager 343 may recognize a format for playing various media files and may encode or decode a media file by using the codec corresponding to a corresponding format. The resource manager 344 may manage a resource such as a source code, a memory, or a storage space of at least any one of the applications 370.

The power manager 345, for example, may operate together with a basic input/output system (BIOS) to manage the battery or power and may provide power information utilized for an operation of the electronic device. The database manager 346 may create, search, or modify a database used in at least one application among the applications 370. The package manager 347 may manage the installation or update of an application distributed in a package file format.

The connectivity manger 348 may manage a wireless connection such as WiFi or Bluetooth. The notification manager 349 may display or notify an event such as arrival messages, appointments, and proximity alerts. The location manager 350 may manage location information on an electronic device. The graphic manager 351 may manage a graphic effect to be provided to a user or a user interface relating thereto. The security manager 352 may provide various security functions utilized for system security or user authentication. According to an embodiment, when an electronic device (for example, the electronic device 101) includes a phone function, the middleware 330 may further include a telephony manager for managing a voice or video call function of the electronic device.

The middleware 330 may include a middleware module for forming a combination of various functions of the above-mentioned components. The middleware 330 may provide a module specialized for each type of OS to provide differentiated functions. Additionally, the middleware 330 may delete part of existing components or add new components dynamically.

The API 360 (for example, the API 145), for example, as a set of API programming functions, may be provided as another configuration according to OS. For example, in the case of android or iOS, one API set may be provided for each platform and in the case Tizen, at least two API sets may be provided for each platform.

The application 370 (for example, the application program 147), for example, may include at least one application for providing functions such as a home 371, a dialer 372, an SMS/MMS 373, an instant message 374, a browser 375, a camera 376, an alarm 377, a contact 378, a voice dial 379, an e-mail 380, a calendar 381, a media player 382, an album 383, a clock 384, health care (for example, measure an exercise amount or blood sugar), or environmental information provision (for example, provide air pressure, humidity, or temperature information).

According to an embodiment, the application 370 may include an application (hereinafter referred to as "information exchange application") for supporting information exchange between the electronic device (for example, the electronic device 101) and an external electronic device (for example, the electronic device 102 or 104). The information exchange application, for example, may include a notification relay application for relaying specific information to the external device or a device management application for managing the external electronic device.

For example, the notification relay application may have a function for relaying to an external electronic device (for example, the electronic device 102 or 104) notification information occurring from another application (for example, an SMS/MMS application, an e-mail application, a health care application, or an environmental information application) of the electronic device. Additionally, the notification relay application may receive notification information from an external electronic device and may then provide the received notification information to a user. The device management application, for example, may manage (for example, install, delete, or update) at least one function (turn-on/turn off of the external electronic device itself (or some components) or the brightness (or resolution) adjustment of a display) of an external electronic device (for example, the electronic device 104) communicating with the electronic device, an application operating in the external electronic device, or a service (for example, call service or message service) provided from the external device.

According to an embodiment, the application 370 may include a specified application (for example, a health care application) according to the property (for example, as the property of an electronic device, when the type of the electronic device is a mobile medical device) of the external electronic device (for example, the electronic device 102 or 104). According to an embodiment, the application 370 may include an application received from an external electronic device (for example, the server 106 or the electronic device 102 or 104). According to an embodiment, the application 370 may include a preloaded application or a third party application downloadable from a server. The names of components in the program module 310 according to the shown embodiment may vary depending on the type of OS.

According to various embodiments, at least part of the program module 310 may be implemented with software, firmware, hardware, or a combination thereof. At least part of the programming module 310, for example, may be implemented (for example, executed) by a processor (for example, the AP 210). At least part of the programming module 310 may include a module, a program, a routine, sets of instructions, or a process to perform at least one function, for example.

Figure 4A:
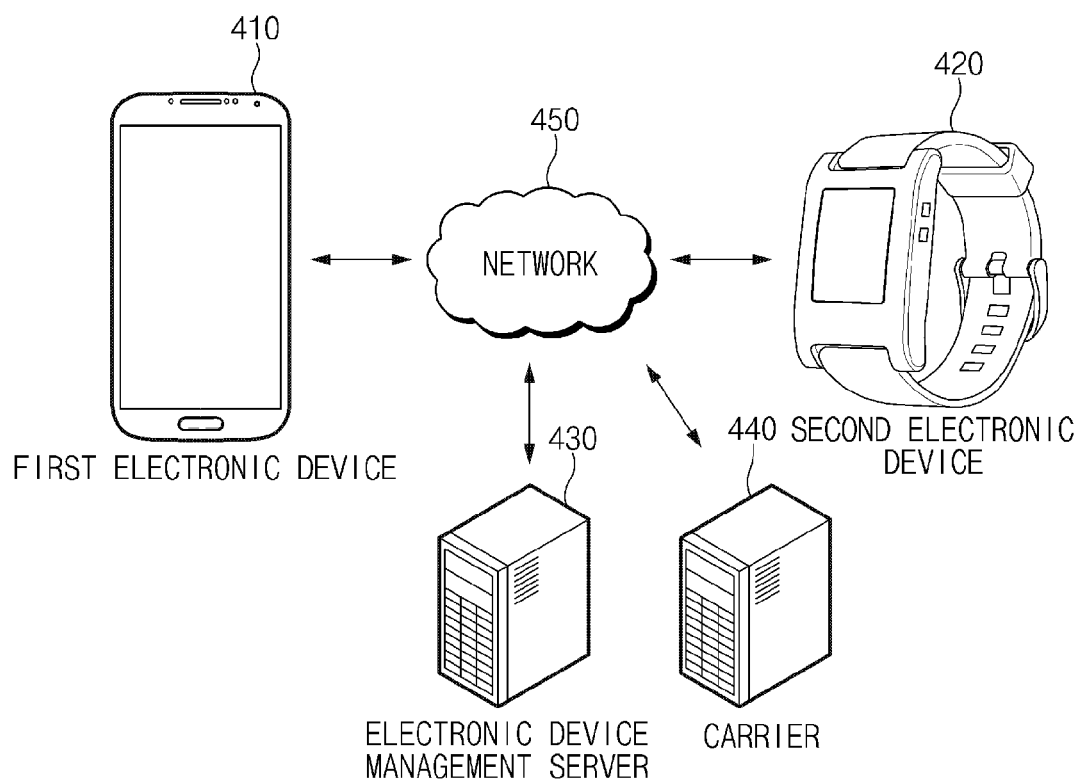
FIG. 4A is a block diagram of a call forwarding system according to various embodiments of the present disclosure.

FIG. 4A is a block diagram of a call forwarding system according to various embodiments of the present disclosure.

Referring to FIG. 4A, the call forwarding system may include a first electronic device 410, a second electronic device 420, an electronic device management server 430, a communication carrier server 440, and a network 450. However, such the call forwarding system of FIG. 4A is just one embodiment of the present disclosure and thus the present disclosure is not interpreted as limited through FIG. 4A. For example, although the electronic device management server 430 is illustrated as an independent device, it may be included in the communication carrier server 440 that is a server managed by a carrier (for example, KT, SKT, LGT, Verizon, and AT&T, etc.). The carrier server 440 is now to be referred to as a communication carrier 440.

As described above, the first electronic device 410 and the second electronic device 420 may be one of various kinds of electronic devices having a communication function. For example, the first electronic device 410 may be a handheld device such as a smartphone or a smart pad, and the second electronic device 420 may be a wearable device such as a smart watch or smart glasses. Hereinafter, it will be assumed that the first electronic device 410 is a smartphone handheld device and the second electronic device 420 is a smart watch wearable device.

The first electronic device 410 and the second electronic device 420 may be utilized by the same user. For example, the first electronic device 410 and the second electronic device 420 may both be owned by one user. In this case, an independent phone number may be assigned to each of the first electronic device 410 and the second electronic device 420. Accordingly, the first electronic device 410 and the second electronic device 420 may execute a call with or exchange a message with another electronic device independently. A phone number at this point is assigned from the carrier 440 and may be different from an IP address utilized for transmitting and receiving IP-based Voice over Internet Protocol (VOIP) or IP-based instant message, electronic device identifier ID, or user identifier ID of an electronic device.

The first electronic device 410 and the second electronic device 420 may be used by being mutually paired with one another. The pairing method may include various methods such as Bluetooth (BT), Near Field communication (NFC), wireless fidelity (WiFi), and WiFi direct. Hereinafter, pairing using BT will be described as an example.

The first electronic device 410 and the second electronic device 420 may have mutual complementary functions when they are paired and utilized together. A user may pair the first electronic device 410 and the second electronic device 420 in a normal situation and then use them.

According to various embodiments of the present disclosure, since the first electronic device 410 and the second electronic device 420 are owned by the same user, when the user leaves their home (for example), the user may carry only one electronic device (for example, the second electronic device 420) of the first electronic device 410 and the second electronic device 420. As described above, since an independent phone number is assigned to each of the first electronic device 410 and the second electronic device 420, each may process an outgoing call or an incoming call, and transmit and/or receive a message independently. However, in this case, a user cannot check calls and/or messages received by the first electronic device 410 when leaving the home, as the first electronic device 410 was left in the house as a reception device.

According to an embodiment of the present disclosure, the first electronic device 410 left in the house may be set to forward calls and/or messages received by the first electronic device 410 to the second electronic device 420, which is carried by a user. However, in this case, when the first electronic device 410 is not connected to a free network (such as WiFi), but rather to cellular data of 3G or 4G, excessive charges may be added to the user's monthly charges.

Accordingly, according to various embodiments of the present disclosure, when a specified condition is satisfied, the first electronic device 410 or the second electronic device 420 may request call forwarding from the carrier 440 in order to allow the second electronic device 420 to receive a call and/or message targeting the first electronic device 410 as a reception device.

For example, when a BT pairing between the first electronic device 410 and the second electronic device 420 is released, the first electronic device 410 or the second electronic device 420 may detect the BT pairing release and may request the start of call forwarding service from the carrier 440.

According to another embodiment of the present disclosure, when a BT pairing between the first electronic device 410 and the second electronic device 420 is released, the second electronic device 420 may transmit a call forwarding request to the first electronic device 410 and the first electronic device 410 may transmit the call forwarding request to the carrier 440, thereby requesting the start of call forwarding service.

The second electronic device 420 may, in some embodiments, directly transmit the call forwarding request to the first electronic device 410, but in other embodiments, the second electronic device 420 may first establish a communication channel with the first electronic device 410 through the electronic device management server 430 and then, the second electronic device 420 may transmit the call forwarding request to the first electronic device 410 through the established communication channel.

The electronic device management server 430 may establish a session between the first electronic device 410 and the second electronic device 420. For example, the electronic device management server 430 may receive a request for connection to the second electronic device 420 from the first electronic device 410 or may receive a request for connection to the first electronic device 410 from the second electronic device 420 to establish the session. The first electronic device 410 and the second electronic device 420 may exchange (or collect) information (for example, each identification information and phone number, etc.) for each other during pairing. Accordingly, when the pairing is released, the first electronic device 410 or the second electronic device 420 may request the establishment of the session from the electronic device management server 430 by using the exchanged (or collected) information.

The electronic device management server 430 may check (e.g., detect) a communication state of the first electronic device 410 and/or the second electronic device 420. For example, the electronic device management server 430 may check the communication state of the first electronic device 410 and/or the second electronic device 420 by using a network ping and checking of the communication state may be performed repeatedly by a specified time unit. For example, when the network ping is received at a faster period than a predetermined period, the electronic device management server 430 may determine that the first electronic device 410 and/or the second electronic device 420 are/is in a communicable state. Unlike this, when the network ping is received at a slower period than a predetermined period, the electronic device management server 430 may determine that the first electronic device 410 and/or the second electronic device 420 are/is in a communication disabled state.

If it is determined that the first electronic device 410 is in a communication disabled state, the electronic device management server 430 may notify the second electronic device 420 that the first electronic device 410 is in a communication disabled state. Similarly, if it is determined that the second electronic device 420 is in a communication disabled state, the electronic device management server 430 may notify the first electronic device 410 that the second electronic device 420 is in a communication disabled state. In this case, the first electronic device 410 may request the release of a call forwarding service set the second electronic device 420 as a target device from the carrier 440.

The electronic device management server 430 may manage each identification information on the first electronic device 410 and/or the second electronic device 420 by matching each identification information with the first electronic device 410 and/or the second electronic device 420 in order for the management of the first electronic device 410 and/or the second electronic device 420. The identification information may be the unique identifier ID of an electronic device, a phone number that the carrier 440 assigns, ICCID information, or IMSI information.

According to various embodiments of the present disclosure, the electronic device management server 430 may synchronize the first electronic device 410 with the second electronic device 420 on a call, message, and event history of each of the first electronic device 410 and the second electronic device 420.

The carrier 440 represents a server managed by a communication carrier and may receive, from the first electronic device 410 or the second electronic device 420, the request of call forwarding (for example, transmits, to the second electronic device 420, a call and/or message that targets the first electronic device 410 as a reception device) that targets the second electronic device 420 as a target device, and may perform the call forwarding in response to this.

The carrier 440 may use information on the first electronic device 410 and the second electronic device 420 in order to perform the call forwarding. For example, the carrier 440 may read information of a SIM card equipped in the first electronic device 410 and the second electronic device 420. According to various embodiments of the present disclosure, the SIM card may include identification information such as Mobile Country Code (MCC), Mobile Network Code (MNC), and Group Identifier (GID). Herein, the MCC may be used to identify the country where the electronic device is used and the MNC may be used to identify a specific network in the identified country. Additionally, the GID may be used to identify the group of a specific electronic device among electronic devices having the same MCC and MNC. Therefore, the carrier 440 may determine whether the first electronic device 410 and the second electronic device 420 are electronic devices that are call forwarding targets for each other by using at least one of the MCC, MNC, and GID included in the SIM card of each of the first electronic device 410 and the second electronic device 420. For example, when it is determined that the first electronic device 410 and the second electronic device 420 are matched to one user account, the carrier 440 may provide call forwarding service.

Similarly, when the carrier 440 receives a release request for the call forwarding service that is set the second electronic device 420 as a target device, from the first electronic device 410 or the second electronic device 420, in response to this, the carrier 440 may release the set call forwarding with respect to the first electronic device 410 and the second electronic device 420.

In the above, it is assumed that an independent phone number is assigned to each of the first electronic device 410 and the second electronic device 420. Hereinafter, as various embodiments of the present disclosure, the call forwarding system will be described by using the case that the first electronic device 410 and the second electronic device 420 has one common phone number as one example. For example, the first electronic device 410 and the second electronic device 420 may have a relationship with different IMSI information but the same mobile station international ISDN number (MSISDN).

The carrier 440 may manage the first electronic device 410 and the second electronic device 420 with a multi-SIM concept using a main-SIM and a sub-SIM. The main-SIM allows an electronic device to perform data communication and perform the transmission/reception of a text message and the incoming/outgoing of a call. On the other hand, the sub-SIM is limited to at least part of functions of the main-SIM and may allow an electronic device to perform only data communication, only the incoming/outgoing of a call, or only the transmission/reception of a text message. However, since a function for supporting the main-SIM and the sub-SIM may vary according to each carrier 440, various embodiments of the present disclosure are not limited to the described embodiment. Hereinafter, it will be described that the sub-SIM performs only a data communication function.

It is assumed that the first electronic device 410 uses the main-SIM and the second electronic device 420 uses the sub-SIM. The main-SIM and the sub-SIM are not a role-divided physical configuration and are determined according to the property that the carrier 440 assigns. Due to the above-mentioned pairing release between the first electronic device 410 and the second electronic device 420, the carrier 440 may receive a signal for requesting call forwarding from the first electronic device 410 or the second electronic device 420. In this case, the carrier 440 may change the main-SIM property assigned to the first electronic device 410 into the sub-SIM property and may change the sub-SIM property assigned to the second electronic device 420 into the main-SIM property. With this, an incoming call received from the outside may be transmitted to the second electronic device 420 instead of the first electronic device 410. Alternatively, the carrier 440 may temporarily assign the role of the main-SIM to the sub-SIM property assigned to the second electronic device 420.

The first electronic device 410, the second electronic device 420, the electronic device management server 430, and the carrier 440 in the call forwarding system may be connected to each other through the network 450. At this point, the network 450 means an information exchange available connection structure between each of mutual nodes such as terminals and servers and may include various kinds of communication methods supported by the communication interface 170 of FIG. 1 and/or the communication module 220 of FIG. 2.

Hereinafter, the first electronic device 410 and the second electronic device 420 included in the call forwarding system of FIG. 4A will be described in more detail.

Figure 4B:
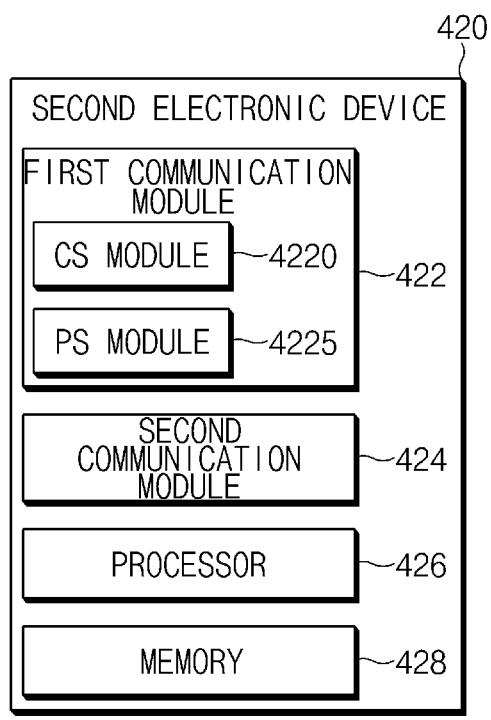
FIG. 4B is a block diagram of a second electronic device according to various embodiments of the present disclosure.

FIG. 4B is a block diagram of the second electronic device 420 according to various embodiments of the present disclosure. Referring to FIG. 4B, the second electronic device 420 may include a first communication module 422, a second communication module 424, a processor 426, and a memory 428. However, the second electronic device 420 shown in FIG. 4B is just one embodiment of the present disclosure and may have several modifications on the basis of the components shown in FIG. 4B. For example, the second electronic device 420 may further include a user interface such as a keyboard and a mouse or a sensor for receiving instructions or information from a user.

The first communication module 422 or the second communication module 424, for example, may include at least the same or similar configuration to the communication interface 170 shown in FIG. 1.

The first communication module 422 may perform cellular communication and/or data communication. For example, the first communication module 422 may include a circuit switching module 4220 (a "CS" module) for performing the cellular communication and a packet switching module 4225 (a "PS" module) for performing the data communication.

The second communication module 424 may perform a communication to connect the second electronic device 420 with the first electronic device 410. The communication, for example, may be a short range communication including at least one of BT, ZigBee, NFC, WiFi direct, and radio frequency identification (RFID).

Hereinafter, the case that the second communication module 424 is connected to (e.g., paired with) the first electronic device 410 by using BT will be described as an example. Since the BT is limited in terms of distance, when the first electronic device 410 and the second electronic device 420 are distanced more than a predetermined (or threshold) distance from each other, the pairing may be broken or otherwise released. Additionally, even when the first electronic device 410 and the second electronic device 420 are within the predetermined distance, the pairing may be released according to a network state or interference from a building or structure.

The processor 426, for example, may include at least the same or similar configuration to the processor 120 shown in FIG. 1.

The processor 426 may generate a signal for requesting call forwarding on the basis of (or in response to detecting) a specified condition. Additionally, the processor 426 may transmit the generated signal for requesting call forwarding to the carrier 440 by using the first communication module 422. However, as described above, the generated signal for requesting call forwarding may be directly transmitted from the second electronic device 420 to the carrier 440 but according to various embodiments of the present disclosure, the generated signal for requesting call forwarding may be transmitted to the carrier 440 through the first electronic device 410. Further, the generated signal for requesting call forwarding may be directly transmitted from the second electronic device 420 to the first electronic device 410 but may be transmitted to the first electronic device 410 through the electronic device management sever 430.

A specified condition for generating the signal for requesting call forwarding, for example, may include the case in which pairing with the first electronic device 410 is released (e.g., communication is terminated or broken). One example may include the situation where two devices are separated by more than predetermined distance spaced from each other because a user leaves the first electronic device 410 in the home and leaves the home with only the second electronic device 420.

Additionally, the specified condition may include the case where the second electronic device 420 is connected to the electronic device management sever 430 through the first communication module 422. According to various embodiments of the present disclosure, when the pairing with the first electronic device 410 is released, the second electronic device 420 may be connected to the electronic device management server 430. However, as soon as the pairing with the first electronic device 410 is released, the second electronic device 420 may not be connected to the electronic device management sever 430 (e.g., disconnected) and when the pairing release is maintained for a specified time, the second electronic device 420 may be connected to the electronic device management server 430. For example, call forwarding may be unnecessary when a user leaves the first electronic device 410 in a room and goes to a living room for a short time with only the second electronic device 420. Additionally, even when the first electronic device 410 and the second electronic device 420 are close to each other, if a network environment is temporarily poor, pairing may be released. In this case, since it is possible that the network environment will be quickly restored and pairing restored, according to various embodiments of the present disclosure, if the pairing is not restored for a specified time after the pairing is released, the call forwarding may be established.

According to various embodiments, the specified condition may include a case of receiving a user input for generating a signal for requesting the call forwarding through a call forwarding UI.

As the above-mentioned condition, the call forwarding UI may be displayed on a screen of the second electronic device 420 when the pairing with the first electronic device 410 is released, or when the second electronic device 420 is connected to the electronic device management server 430. In this case, when a user wants call forwarding, the call forwarding may be established by receiving a user input. Accordingly, automatic call forwarding may be prevented when a user does not want call forwarding, for example, when a network state is not good for a time period, or when the first electronic device 410 and the second electronic device 420 are separated from each other for only a brief moment. Additionally, the call forwarding UI may be displayed on the screen of the second electronic device 420 through a user input for calling the call forwarding UI. That is, when a user wants to use call forwarding in addition to the case that the pairing with the first electronic device 410 is released or the case that the second electronic device 420 is connected to the electronic device management sever 430, the second electronic device 420 may allow a user to select whether to made the call forwarding by displaying the call forwarding UI.

When the pairing between the second electronic device 420 and the first electronic device 410 is released or when the second electronic device 420 is connected to the electronic device management server 430, a user may set not to use call forwarding in the call forwarding UI. When pairing is released (disconnected), a user may use the second electronic device 420 without call forwarding. When call forwarding is desired, a user may use the call forwarding service by displaying the call forwarding UI on the screen of the second electronic device 420 through a user input.

When the call forwarding service is utilized, instead of the first electronic device 410, the first communication module 422 may receive a voice call signal or message that targets the first electronic device 410 as a reception device from the carrier 440.

The second electronic device 420 may further include a sensor (e.g., as part of the sensor module 240) for detecting a human body. The processor 426 may activate the first communication module 422 or may generate a signal for requesting call forwarding only when a human body is detected. For example, the reason is that when a user carries out only the first electronic device 410 instead of the second electronic device 420, call forwarding is not supposed to be made.

However, according to various embodiments of the present disclosure, even when the human body (user) is detected, whether to make call forwarding may be adaptively determined according to a wearing state of the second electronic device 420. For example, the processor 426 may not perform call forwarding when a user exercising or sleeping while wearing the second electronic device 420.

The first communication module 422 of the second electronic device 420 may be in an activated state at all times. However, according to various embodiments of the present disclosure, the first communication module 422 may be in a deactivated state in order to allow for low power consumption. In this case, the first communication module 422 may be activated in order for performing the above-mentioned call forwarding. An activation operation of the first communication module 422 may be performed similar to a generation operation of a signal requesting call forwarding.

For example, when a connection with the first electronic device 410 is terminated (e.g., by disconnection), or when the second electronic device 420 is connected to the electronic device management server 430 through the first communication module 422, or when a user input requesting the activation of the first communication module 422 is received through a first communication module activation UI, the processor 426 may activate the first communication module 422.

However, according to various embodiments of the present disclosure, the call forwarding request and the activation of the first communication module 422 correspond to each other and they may be performed simultaneously.

As mentioned above, the first communication module 422 may include the CS module 4220 and the PS module 4225, and an operation for activating the first communication module 422 may including activating at least one of the CS module 4220 and the PS module 4225. For example, the processor 426 may activate both the CS module 4220 and the PS module 4225. However, according to various embodiments of the present disclosure, the processor 426 may also activate only the CS module 4220. If the CS module 4220 is in an activated state already, an operation for activating the first communication module 422 may be an operation for activating the PS module 4225.

The processor 426 may generate a signal for requesting the release of call forwarding in order to transmit a voice call signal or message to the first electronic device 410. During the call forwarding service, a user cannot directly make a call or transmit a message to the first electronic device 410. Accordingly, in order to directly make a call or transmit a message to the first electronic device 410, the call forwarding service needs to be released, so a user may call the call forwarding UI and may generate a signal for requesting release of call forwarding, based on a user input for requesting release of call forwarding. The generated signal for requesting release of call forwarding may be transmitted to the carrier 440 through the first communication module 422. According to various embodiments of the present disclosure, the generated signal for requesting release of call forwarding may be directly transmitted to the carrier 440 or may be transmitted to the carrier 440 through the first electronic device 410 (or through the electronic device management sever 430).

Additionally, a release operation for the call forwarding service may be performed in a procedure which is essentially the reverse of an operation for starting the call forwarding service. For example, during the use of call forwarding service, when the second electronic device 420 is connected to the first electronic device 410 or when a connection with the electronic device management server 430 is disconnected, the call forwarding service may be released.

A signal for requesting call forwarding or a signal requesting the release of call forwarding may be in one format of a voice message, a text message, a multimedia message, a Mobile Application Part (MAP) message, and an Unstructured Supplementary Service Data (USSD) message.

During the utilization of the call forwarding service, the processor 426 may display an indicator notifying a user that the call forwarding service is active on a screen. Similarly, while the first communication module 422 activated, the processor 426 may display an indicator for notifying that the first communication module 422 is in activation on the screen.

The memory 428 may store data. The memory 428, for example, may include at least the same or similar configuration to the memory 130 shown in FIG. 1. At this point, the data stored in the memory 428 may include data inputted and outputted between each component inside the second electronic device 420 and may include data inputted and outputted between the second electronic device 420 and components outside the second electronic device 420. For example, the memory 428 may store information on the first electronic device 410, which is received by the second communication module 424. An embodiment of such the memory 428 may include hard disk drive, ROM, RAM, flash memory, and a memory card inside or outside the second electronic device 420.

The content mentioned with reference to FIG. 4B may be applied to the above-mentioned multi-SIM concept as another embodiment of the present disclosure. For example, in addition to the case that the pairing between the second electronic device 420 and the first electronic device 410 is released, when the second electronic device 420 is connected to the electronic device management server 430 and a user input for generating a signal for requesting the call forwarding is received through a call forwarding UI, the sub-SIM property assigned to the second electronic device 420 may change into the main-SIM property by the carrier 440.

When the call forwarding is released, it may be similarly applied. For example, during the use of call forwarding service, when pairing with the first electronic device 410 is present, or when the connection with the electronic device management server 430 is disconnected, or when a user input for generating a signal for requesting the release of the call forwarding service is received, the main-SIM property assigned to the second electronic device 420 may change into the sub-SIM property by the carrier 440.

Those skilled in the art understand enough that the first communication module 422, the second communication module 424, the processor 426, and the memory 428 may be separated and implemented or at least one of them is integrated and implemented.

Figure 4C:
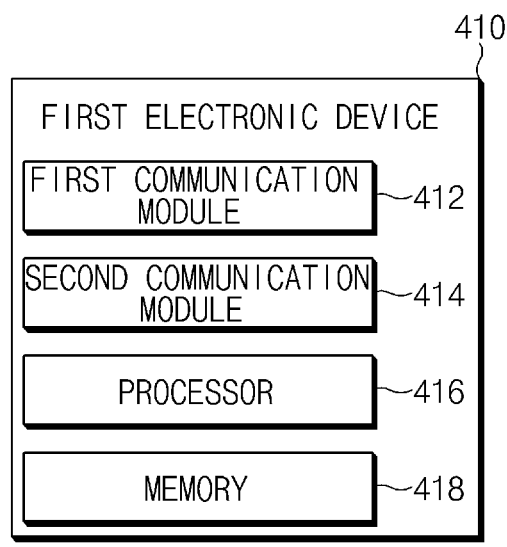
FIG. 4C is a block diagram of a first electronic device according to various embodiments of the present disclosure.

FIG. 4C is a block diagram of the first electronic device 410 according to various embodiments of the present disclosure. Referring to FIG. 4C, the first electronic device 410 may include a first communication module 412, a second communication module 414, a processor 416, and a memory 418. However, the first electronic device 410 shown in FIG. 4C is just one embodiment of the present disclosure and several modifications on the basis of the components shown in FIG. 4C are possible identical to those of FIG. 4C.

The first communication module 412 or the second communication module 414, for example, may include at least the same or similar configuration to the communication interface 170 shown in FIG. 1.

The first communication module 412 may perform cellular communication and data communication. Additionally, the second communication module 414 may perform a communication to connect to the second electronic device 420. As mentioned with reference to FIG. 4B, the first electronic device 410 and the second electronic device 420 are paired mutually by using a short range communication such as BT.

According to various embodiments of the present disclosure, while a connection between the first electronic device 410 and the second electronic device 420 is maintained, the first communication module 412 may receive a voice call signal or a message that directed to the first electronic device 410 as a reception device from the carrier 440. However, even while a connection between the first electronic device 410 and the second electronic device 420 is maintained, if a call forwarding service using the second electronic device 420 as a target device is in use, a voice call signal or message using the first electronic device 410 as a reception device may be received by the second electronic device 420.

The processor 416, for example, may include at least the same or similar configuration to the processor 120 shown in FIG. 1.

The processor 416 may generate a signal for requesting call forwarding when a connection between the first electronic device 410 and the second electronic device 420 is terminated or disconnected. The processor 416 may transmit the generated signal for requesting call forwarding to the carrier 440 using the first communication module 412. Alternatively, when receiving the signal requesting call forwarding from the second electronic device 420 or the electronic device management server 430 through the first communication module 412, the processor 416 may transmit the received signal requesting call forwarding to the carrier 440 using the first communication module 412. According to various embodiments of the present disclosure, the processor 416 may generate a new message requesting call forwarding on the basis of the received signal for requesting call forwarding, and may transmit the newly generated message to the carrier 440 through the first communication module 412.

When the first electronic device 410 and the second electronic device 420 are connected again through the second communication module 414, the processor 416 may generate a signal for requesting release of call forwarding. The processor 416 may transmit the generated signal for requesting release of call forwarding to the carrier 440 through the first communication module 412.

Alternatively, when receiving, from the electronic device management sever 430, a communication-disabled state notification on the second electronic device 420 through the first communication module 412, the processor 416 may generate a signal for requesting the release of call forwarding, and transmit it to the carrier 440 through the first communication module 412.

During the use of call forwarding service, the processor 416 may display an indicator for notifying that the call forwarding service is in use on a screen of the first electronic device 410. Accordingly, a user may check whether call forwarding service is in use by checking the indicator displayed on the screen of the first electronic device 410. If a user leaves the second electronic device 420 in the home and carries only the first electronic device 410, a connection between the first electronic device 410 and the second electronic device 420 is disconnected, and thus, a call forwarding service may be established. In this case, since a user cannot receive any contact with only the first electronic device 410, the user may notice the indicator on the screen, and apply a user input to allow the processor 416 to display a call forwarding UI controlling the call forwarding service.

According to various embodiments of the present disclosure, when a connection between the first electronic device 410 and the second electronic device 420 is disconnected, the processor 416 may display the call forwarding UI on the screen without an additional user input in order to query a user as to whether to use a call forwarding service.

In addition to the case where a connection between the first electronic device 410 and the second electronic device 420 is terminated or disconnected, when the first electronic device 410 is connected to the electronic device management sever 430 or receives a user input for requesting the call forwarding on the call forwarding UI, the call forwarding service may be performed through a user input for requesting call forwarding. Accordingly, the operation mentioned for call forwarding service in the case that a connection between the first electronic device 410 and the second electronic device 420 is disconnected may be applied to the case that the first electronic device 410 is connected to the electronic device management sever 430 or receives the user input for requesting the call forwarding.

On the other hand, an operation for releasing call forwarding may be performed when the first electronic device 410 and the second electronic device 420 are connected to each other, when a connection between the first electronic device 410 and the electronic device management server 430 is disconnected, or when there is a user input for requesting the release of call forwarding.

The memory 418 may store data. The memory 418, for example, may include at least the same or similar configuration to the memory 130 shown in FIG. 1. At this point, the data stored in the memory 418 includes data inputted and outputted between each component inside the first electronic device 410 and may include data inputted and outputted between the first electronic device 410 and components outside the first electronic device 410.

Those skilled in the art would understand that the first communication module 412, the second communication module 414, the processor 416, and the memory 418 may be implemented separately, or at least one of them is implemented integrally.

Hereinafter, various operations performed in the first electronic device 410 and the second electronic device 420 will be described in more detail.

Figure 5A:
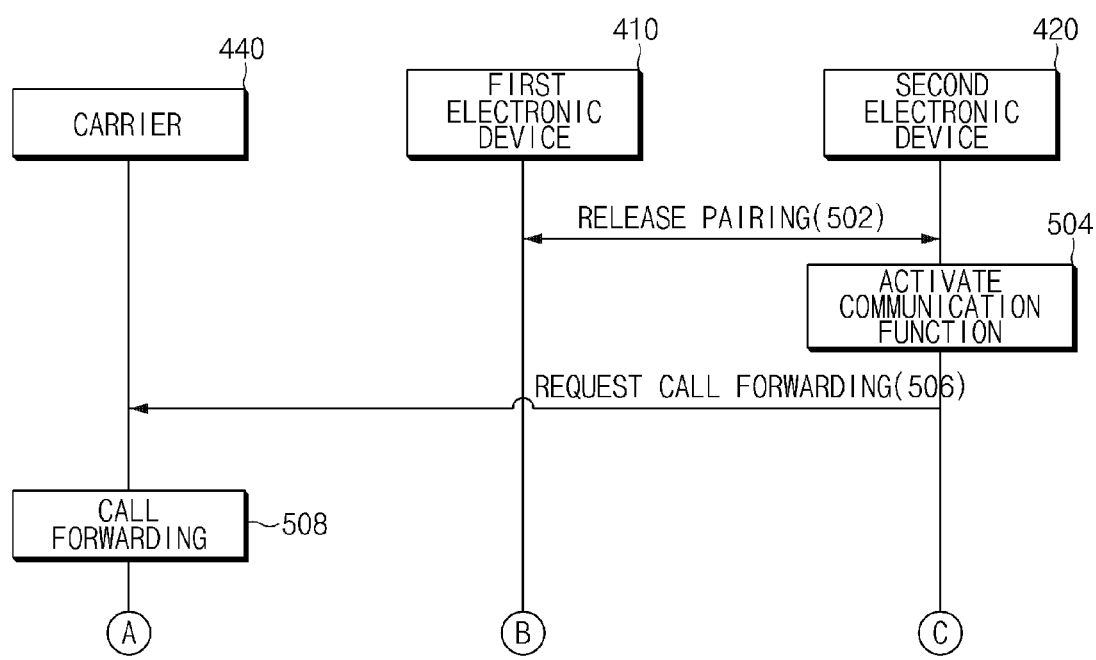
FIG. 5A is a flowchart illustrating a call forwarding method when a pairing between a first electronic device and a second electronic device is released according to various embodiments of the present disclosure.
Figure 5B:
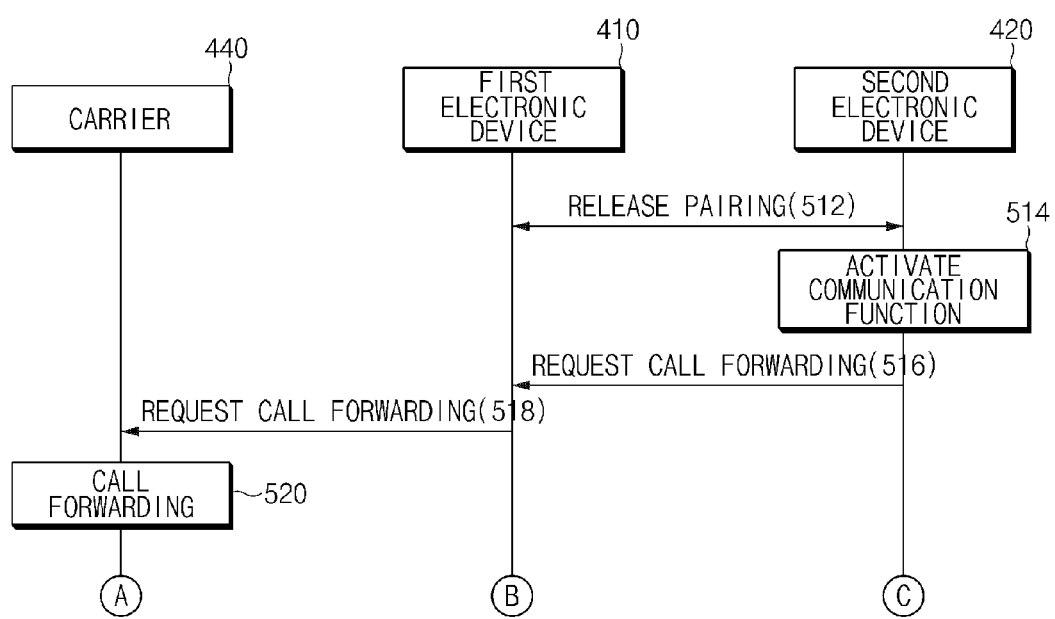
FIG. 5B is a flowchart illustrating a call forwarding method when a pairing between a first electronic device and a second electronic device is released according to other various embodiments of the present disclosure.
Figure 5C:
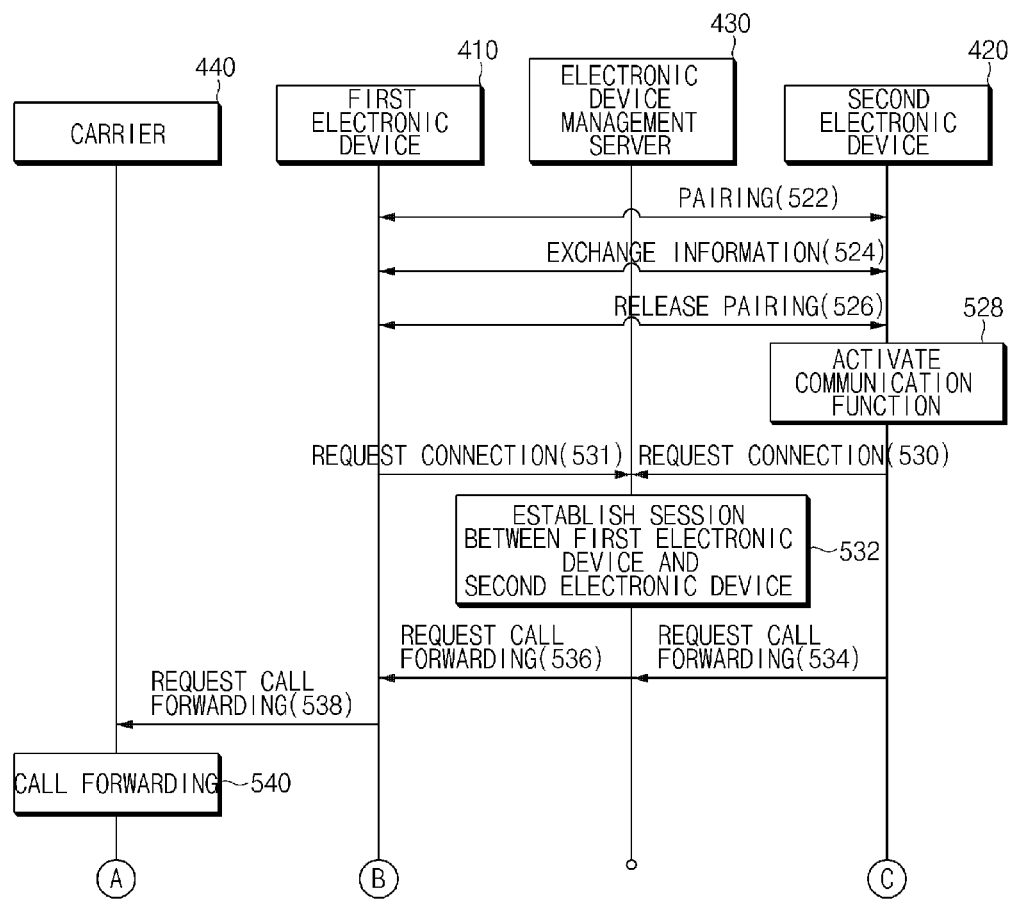
FIG. 5C is a flowchart illustrating a call forwarding method when a pairing between a first electronic device and a second electronic device is released according to other various embodiments of the present disclosure.

FIGS. 5A to 5C are flowcharts illustrating a call forwarding method when a pairing between the first electronic device 410 and the second electronic device 420 is released according to various embodiments of the present disclosure. The call forwarding method based on the pairing release according to an embodiment shown in FIGS. 5A to 5C may include operations processed in time series in the first electronic device 410, the second electronic device 420, the electronic device management server 430, the carrier 440, and the network 450 according to the various embodiments shown in FIGS. 1 to 4. Accordingly, even if there are contents omitted below, the contents described in relation to the first electronic device 410, the second electronic device 420, the electronic device management server 430, the carrier 440, and the network 450 of FIGS. 1 to 4 may be applied to the call forwarding method based on the pairing release according to the embodiments shown in FIGS. 5A to 5C.

Referring to FIG. 5A, a pairing between the first electronic device 410 and the second electronic device 420 may be released (disconnected) in operation 502. Basically, an effective distance of a pairing using BT may be within 10 meters and the pairing may be released as it is out of the effective distance. Besides that, the release of the pairing may be made by turning off one of the first electronic device 410 and the second electronic device 420 or a user input of a user who releases the pairing.

In operation 504, the second electronic device 420 may detect the pairing release in operation 502 and may activate a communication function. For example, the second electronic device 420 may activate only a communication function (for example, the second communication module 424) utilized for the pairing during the pairing and may activate a cellular communication function and a data communication function (the first communication module 422) when the pairing is released. According to various embodiments of the present disclosure, the second electronic device 420 may activate any one function of the CS module 4220 and the PS module 4225.

According to another embodiment of the present disclosure, a communication function of the second electronic device 420 may be in an activated state at all times. However, this may accelerate the battery consumption of a wearable device (for example, the second electronic device 420) and as mentioned above, the second electronic device 420 may activate only a communication function utilized for the pairing.

In operation 506, the second electronic device 420 may generate a signal for requesting call forwarding and transmit it to the carrier 440. The signal may be formed of any one format among a voice message, a text message, a multimedia message, an Unstructured Supplementary Service Data (USSD) message, and a Mobile Application Part (MAP) message.

In operation 508, the carrier 440 may start call forwarding service to transmit a call and/or message received from external by targeting the first electronic device 410 as a reception device, to the second electronic device 420 in response to the call forwarding request signal received in operation 506.

Referring to FIG. 5B, a pairing between the first electronic device 410 and the second electronic device 420 may be released (disconnected) in operation 512 and on the basis of this, the second electronic device 420 may activate a communication function in operation 514.

In operation 516, the second electronic device 420 may generate a signal for requesting call forwarding and may transmit the generated signal requesting call forwarding to the first electronic device 410 using the communication function activated in operation 514.

In operation 518, the first electronic device 410 may transmit the signal for requesting call forwarding received in operation 516 to the carrier 440.

In operation 520, the carrier 440 may initiate the call forwarding service to forward a call and/or message directed to the first electronic device 410 (e.g., as a reception device) to the second electronic device 420, in response to the call forwarding request signal received in operation 518.

Referring to FIG. 5C, the first electronic device 410 and the second electronic device 420 may be paired with each other in operation 522.

In operation 524, the first electronic device 410 and the second electronic device 420 may mutually exchange information during pairing. For example, the first electronic device 410 may obtain identification information on the second electronic device 420 and the second electronic device 420 may obtain identification information on the first electronic device 410.

In operation 526, the pairing between the first electronic device 410 and the second electronic device 420 may be released due to various causes. For example, when a communication state degrades or becomes worse, or a distance between the first electronic device 410 and the second electronic device 420 grows to be more than an effective distance of communication, pairing may be released.

In operation 528, the second electronic device 420 may activate a communication function on the basis of the pairing release in operation 526.

In operation 530, the second electronic device 420 may request a connection from the electronic device management server 430. Similarly, in operation 531, the first electronic device 410 may request a connection from the electronic device management server 430. The order of operation 530 and operation 531 may be changed or may be performed at the same time. In some alternate embodiments, only one of operation 530 and operation 531 may be performed.

In operation 532, the electronic device management server 430 may establish a communication session between the first electronic device 410 and the second electronic device 420. For example, the connection request received in operation 530 may include information on the first electronic device 410 and the second electronic device 420, and the electronic device management server 430 may establish the session between the first electronic device 410 and the second electronic device 420 by using the information on the first electronic device 410 and the second electronic device 420. Similarly, the connection request received in operation 531 may include information on the first electronic device 410 and the second electronic device 420, and the electronic device management server 430 may establish the session between the first electronic device 420 and the second electronic device 420 using the information on the first electronic device 410 and the second electronic device 420.

Through the established session, the first electronic device 410 and the second electronic device 420 may mutually transmit and/or receive data. In operation 534 and operation 536, the second electronic device 420 may transmit a signal for requesting call forwarding to the first electronic device 410 through the electronic device management server 430.

In operation 538, the first electronic device 410 may transmit the signal for requesting call forwarding received in operation 536 to the carrier 440. According to various embodiments of the present disclosure, the first electronic device 410 may generate the signal for requesting call forwarding to transmit it to the carrier 440 on the basis of only operation 532 without operation 534 and operation 536.

In operation 540, the carrier 440 may start call forwarding service to transmit a call and/or message directed to the first electronic device 410 (e.g., as a reception device) to the second electronic device 420 in response to the call forwarding request signal received in operation 538.

Figure 5D:
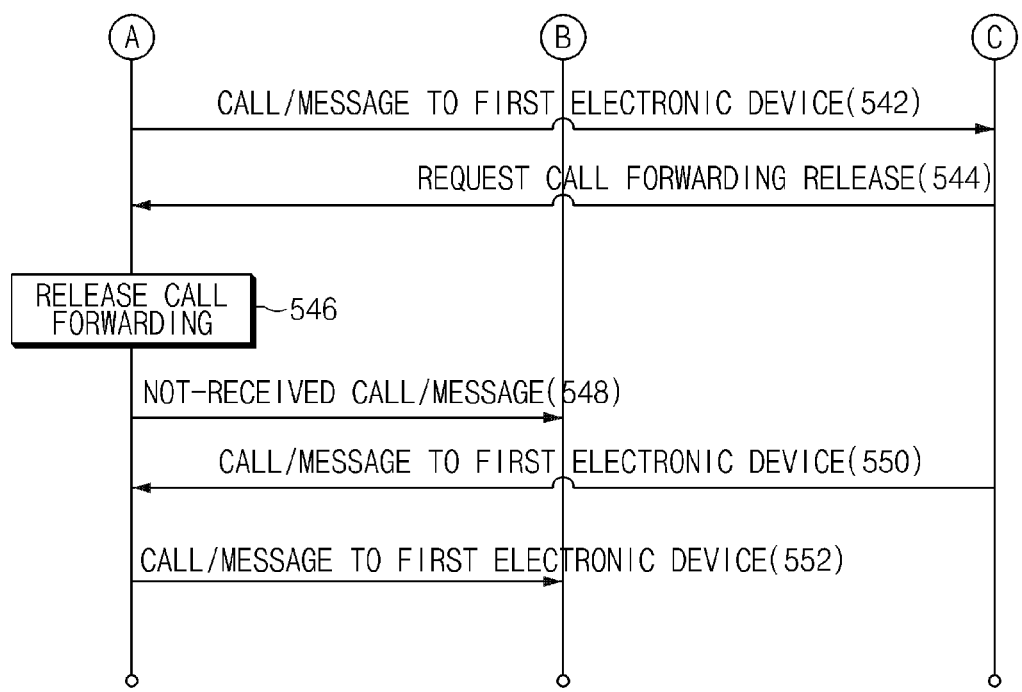
FIG. 5D is a flowchart illustrating a communication method with a first electronic device and a second electronic device during a call forwarding release according to various embodiments of the present disclosure.

FIG. 5D is a flowchart illustrating a communication method with the first electronic device 410 and the second electronic device 420 during call forwarding release according to various embodiments of the present disclosure.

In operation 542, the carrier 440 may transmit to the second electronic device 420 a call and/or message directed to the first electronic device 410 (e.g., as a reception device) based on the established call forwarding performed in operation 508, operation 520, or operation 540.

However, when call forwarding to the second electronic device 420 is operative, a user cannot send a call or transmit a message to the first electronic device 410 using the second electronic device 420, which may be required, such as when the first electronic device 410 is given to children to prevent an emergency situation, or if, after leaving the first electronic device 410 in a certain place, the user tries to contact someone who is near the first electronic device 410 at the certain place. Accordingly, a user carrying the second electronic device 420 may need to release (by using the second electronic device 420) a call forwarding service sets the second electronic device 420 as a target device.

In operation 544, the second electronic device 420 may transmit to the carrier 440 a release request for the call forwarding service setting the second electronic device 420 as a target device. In this case, a signal for requesting a call forwarding release, as described above, may be formed of any one format among a voice message, a text message, a multimedia message, an USSD message, and a MAP message.

According to various embodiments of the present disclosure, the second electronic device 420 may transmit to the carrier 440 the release request for the call forwarding service through the first electronic device 410. Alternately, the second electronic device 420 may transmit to the carrier 440 the release request for the call forwarding service through the electronic device management server 430 and the first electronic device 410.

In operation 546, the carrier 440 may release the call forwarding service setting the second electronic device 420 as a target device based on a call forwarding release request message received in operation 544.

In operation 548, the carrier 440 may transmit to the first electronic device 410 call and/or message directed to the first electronic device 410 (e.g., as a reception device), which is transmitted to the second electronic device 420 instead of the first electronic device 410 due to the provisions of the established call forwarding service.

In operation 550, the second electronic device 420 may transmit to the carrier 440 a call or message to be sent to the first electronic device 410.

In operation 552, the carrier 440 may transmit the call or message received in operation 550 to the first electronic device 410 based on the released call forwarding service performed in operation 546.

The order of operation 502 to operation 552 described with reference to FIGS. 5A to 5D is just an example and the disclosure is not limited thereto. That is, the order of the above-mentioned operations may mutually vary according to time, and some operations among them may even be performed at the same time (e.g., simultaneously). Additionally, the above-mentioned operations may be repeated periodically at specified times and/or may be performed again on the basis of a user input inputted from a user.

Furthermore, since some operations may be omitted, for example, a not-received (e.g., missed) call and/or message to be transmitted to the first electronic device 410 in operation 548 may not be transmitted in addition to the transmitted information.

Figure 6:
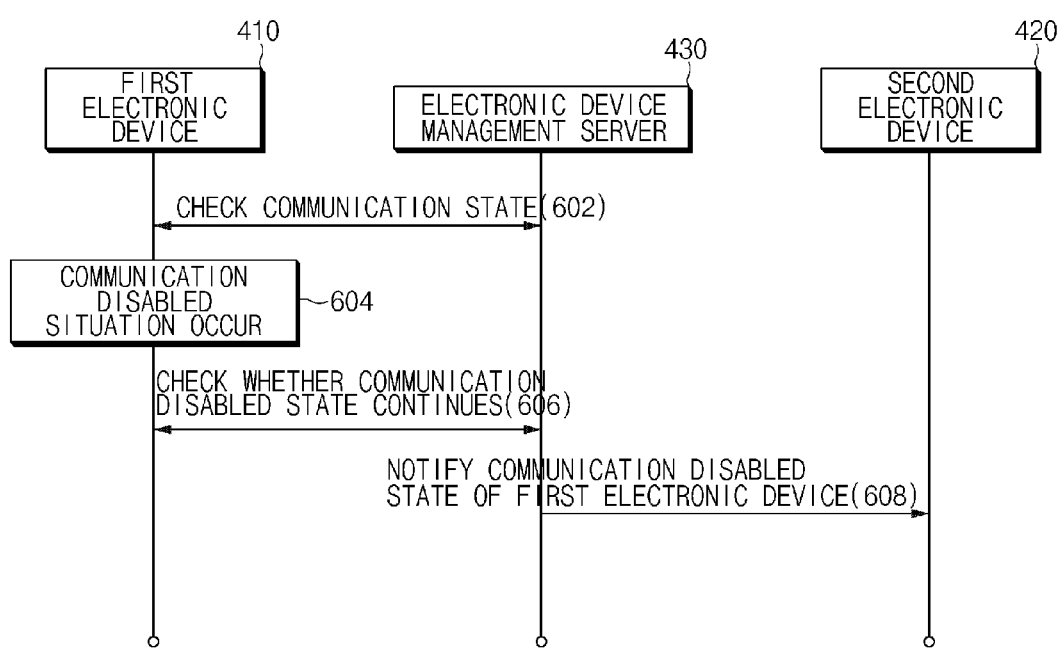
FIG. 6 is a flowchart illustrating a method of managing an electronic device management device in correspondence to the case that a communication of a first electronic device is disabled during call forwarding service according to various embodiments of the present disclosure.

FIG. 6 is a flowchart illustrating a method of managing the electronic device management device 430 in correspondence to the case that a communication of the first electronic device 410 is disabled during the call forwarding service according to various embodiments of the present disclosure. The management method of the electronic device management device 430 during the communication disability of the first electronic device 410, according to an embodiment shown in FIG. 6, may include operations processed in time series in the first electronic device 410, the second electronic device 420, the electronic device management server 430, the carrier 440, and the network 450 according to the various embodiments shown in FIGS. 1 to 4. Accordingly, even if there are contents omitted below, the contents described in relation to the first electronic device 410, the second electronic device 420, the electronic device management server 430, the carrier 440, and the network 450 of FIGS. 1 to 4 may be applied to the management method of the electronic device management device 430 during the communication disability of the first electronic device 410 according to an embodiment shown in FIG. 6.

In operation 602, the electronic device management server 430 may check a communication state of the first electronic device 410. The checking of the communication state performed in operation 602 may be performed periodically by a specified time unit and this may be performed by using a network ping.

In operation 604 and operation 606, when a communication-disabled state of the first electronic device 410 occurs, the electronic device management server 430 may check whether the communication disabled state of the first electronic device 410 continues for a specified time.

In operation 608, when the communication disabled state of the first electronic device 410 continues for the specified time, the electronic device management server 430 may notify the second electronic device 420 that the first electronic device 410 is in the communication disabled state.

According to another embodiment of the present disclosure, operation 606 may be omitted and in this case, as soon as it is checked that the first electronic device 410 is in the communication disabled state, the electronic device management server 430 may notify the second electronic device 420 that the first electronic device 410 is in the communication-disabled state.

The order of operation 602 to operation 608 described with reference to FIG. 6 is just an example and the disclosure is not limited thereto. That is, the order of the above-mentioned operations may mutually vary and some operations among them may be performed at the same time. Additionally, the above-mentioned operations may be repeated periodically at specified times and may be performed again on the basis of a user input.

Figure 7A:
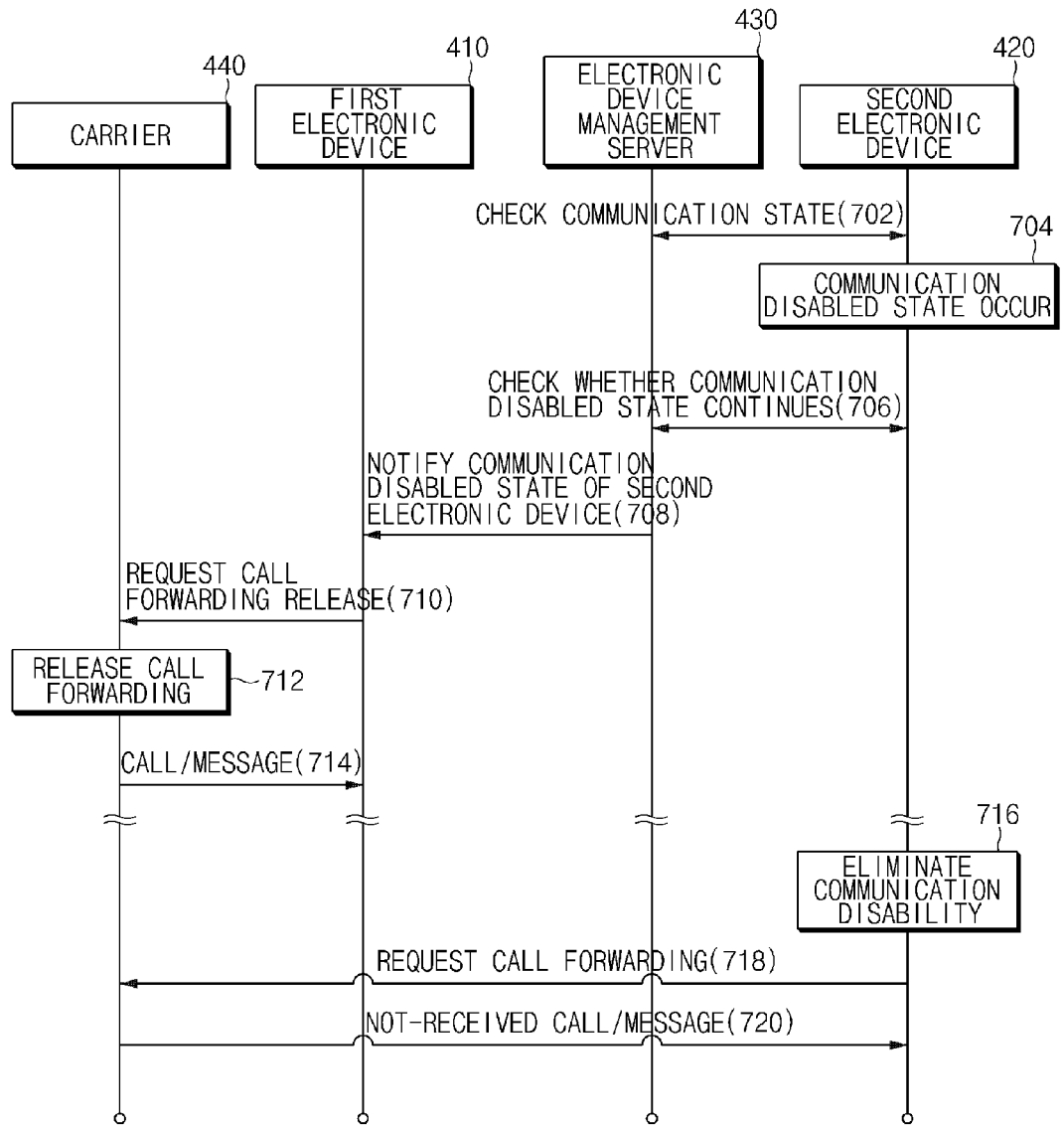
FIG. 7A is a flowchart illustrating a method of managing an electronic device management device in correspondence to the case that a communication of a second electronic device is disabled during call forwarding service according to various embodiments of the present disclosure.
Figure 7B:
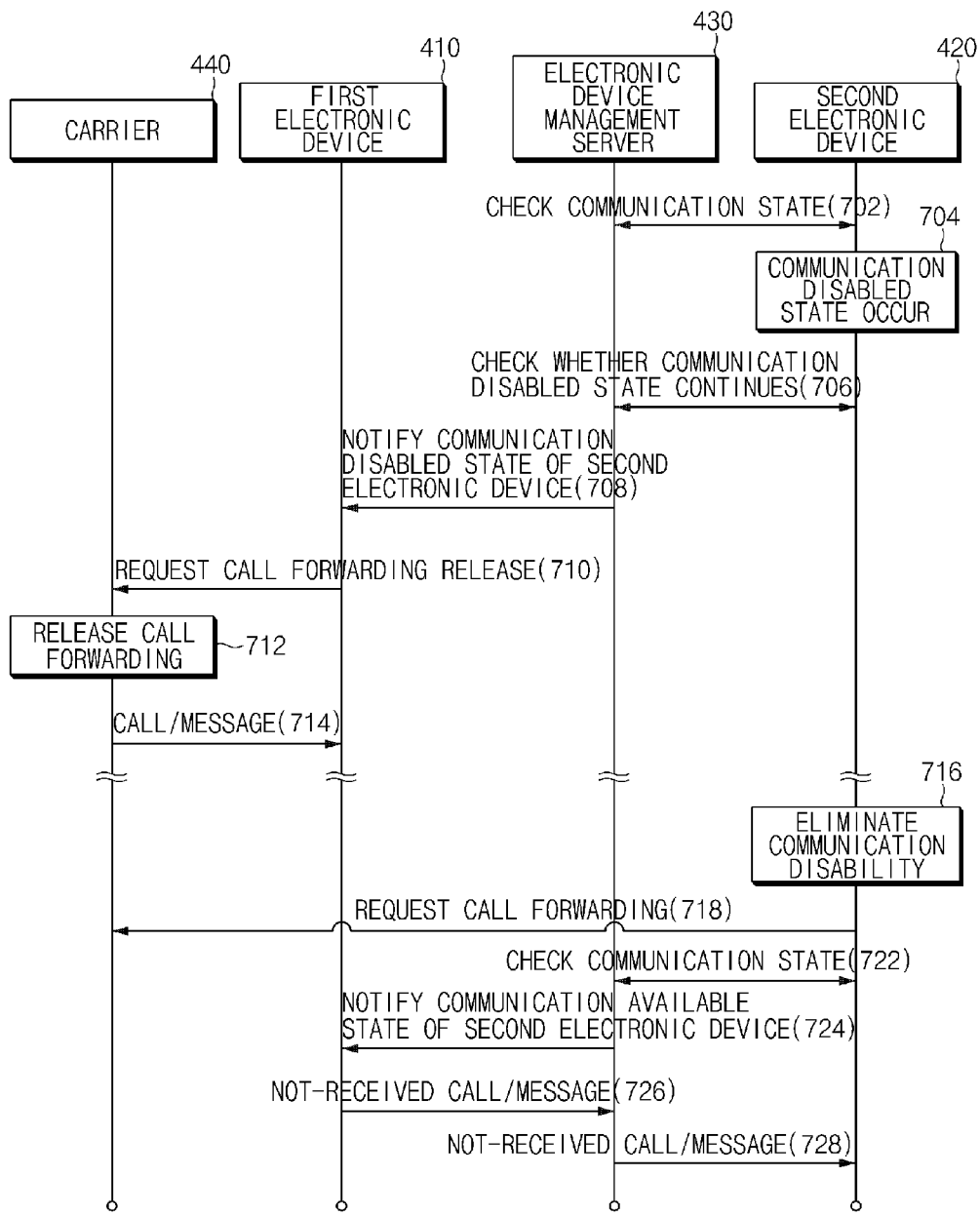
FIG. 7B is a flowchart illustrating a method of managing an electronic device management device in correspondence to the case that a communication of a second electronic device is disabled during call forwarding service according to other various embodiments of the present disclosure.

FIGS. 7A and 7B are flowcharts illustrating a method of managing the electronic device management device 430 in correspondence to the case that a communication of the second electronic device 420 is disabled during call forwarding service according to various embodiments of the present disclosure. The management method of the electronic device management device 430 during the communication disability of the second electronic device 420 according to an embodiment shown in FIGS. 7A and 7B may include operations processed in time series in the first electronic device 410, the second electronic device 420, the electronic device management server 430, the carrier 440, and the network 450 according to the various embodiments shown in FIGS. 1 to 4. Accordingly, even if there are contents omitted below, the contents described in relation to the first electronic device 410, the second electronic device 420, the electronic device management server 430, the carrier 440, and the network 450 of FIGS. 1 to 4 may be applied to the management method of the electronic device management device 430 during the communication disability of the second electronic device 420 according to an embodiment shown in FIGS. 7A and 7B.

Referring to FIG. 7A, in operation 702, the electronic device management server 430 may check (or detect) a communication state of the second electronic device 420. The checking of the communication state performed in operation 702 may be performed periodically by using a network ping.

In operation 704 and operation 706, when a communication disabled state of the second electronic device 420 occurs, the electronic device management server 430 may check whether the communication disabled state of the second electronic device 420 continues for a specified time.

In operation 708, when the communication disabled state of the first electronic device 420 continues for the specified time, the electronic device management server 430 may notify the first electronic device 410 that the second electronic device 420 is in the communication disabled state.

According to another embodiment of the present disclosure, operation 706 may be omitted and in this case, as soon as it is checked (and confirmed) that the second electronic device 420 is in the communication disabled state, the electronic device management server 430 may notify the first electronic device 410 that the second electronic device 420 is in the communication disabled state.

In operation 710, the first electronic device 410 may transmit to carrier 440 a release request for the call forwarding service set the second electronic device 420 as a target device.

In operation 712, the carrier 440 may release a call forwarding service set for the second electronic device 420 in response to the call forwarding release request received in operation 710.

Operation 714 illustrates that a call or message targeted to the first electronic device 410 is transmitted to the first electronic device 410 according to the release of the call forwarding service.

In operation 716 and operation 718, when the communication disabled state of the second electronic device 420 is eliminated, the second electronic device 420 may transmit to carrier 440 a call forwarding service request.

According to another embodiment of the present disclosure, the elimination of the communication disabled state of the second electronic device 420 shown in operation 716 may be obtained by checking a communication state check performed periodically in the electronic device management server 430. Accordingly, the electronic device management server 430 may request a call forwarding service for the second electronic device 420 from the carrier 440.

In operation 720, the carrier 440 may transmit, to the second electronic device 420, information on a call or message transmitted to the first electronic device 410 in operation 714.

In this case, the carrier 440 may transmit the not-received (e.g., missed) message as it is to the second electronic device 420. In one alternative, the carrier 440 may transmit the not-received message in summary form to the second electronic device 420 and, only when it receives a request of details from the second electronic device 420, the carrier 440 may transmit an original message to the second electronic device 420.

In another embodiment, the second electronic device 420 may receive a not-received or missed message in an original form from the carrier 440, but may display the received missed message in a summary form on a screen.

Here, the message in summary form may represent the number of the not-received messages. The original message may represent the caller, calling time, and message content of a not-received message. Information on the not-received call may include the caller and calling time of the not-received call.

Additionally, a subject for transmitting a not-received call or message to the second electronic device 420 in operation 718 may be the electronic device management server 430 instead of the carrier 440.

Hereinafter, FIG. 7B illustrating a different embodiment from FIG. 7A will be described. Operation 702 to operation 718 shown in FIG. 7B correspond to operation 702 to operation 718 shown in FIG. 7A and the same operation numbers are assigned. Accordingly, descriptions of overlapping contents are omitted.

Referring to FIG. 7B, in operation 722, the electronic device management server 430 may check a communication state of the second electronic device 420. The communication state check performed in operation 722 may be identical to the communication state check performed in operation 706.

In operation 724, the electronic device management server 430 may transmit to the first electronic device 410 a state in which a communication of the second electronic device 420 is available.

In operation 726 and operation 728, the first electronic device 410 may transmit information on the call or message transmitted to the first electronic device 410 in operation 714 to the second electronic device 420 through the electronic device management server 430.

According to various embodiments of the present disclosure, the electronic device management server 430 may synchronize a call, message, and event history delivered to each electronic device regardless of a call forwarding setting (e.g., enabled or disabled) in the carrier 440. Accordingly, in this case, operation 724 and operation 726 may be omitted, and when the second electronic device 420 enters a communicable state through operation 722 from the communication disability state, the electronic device management server 430 may directly transmit information for the not-received call and/or the not-received message (e.g., missed calls and/or messages) to the second electronic device 420.

The order of operation 702 to operation 728 described with reference to FIGS. 7A and 7B is just an example and the disclosure is not limited thereto. That is, the order of the above-mentioned operations may mutually vary and some operations among them may be performed at the same time. Additionally, the above-mentioned operations may be repeated periodically at each specified time and may be performed again on the basis of a user input.

Figure 8:
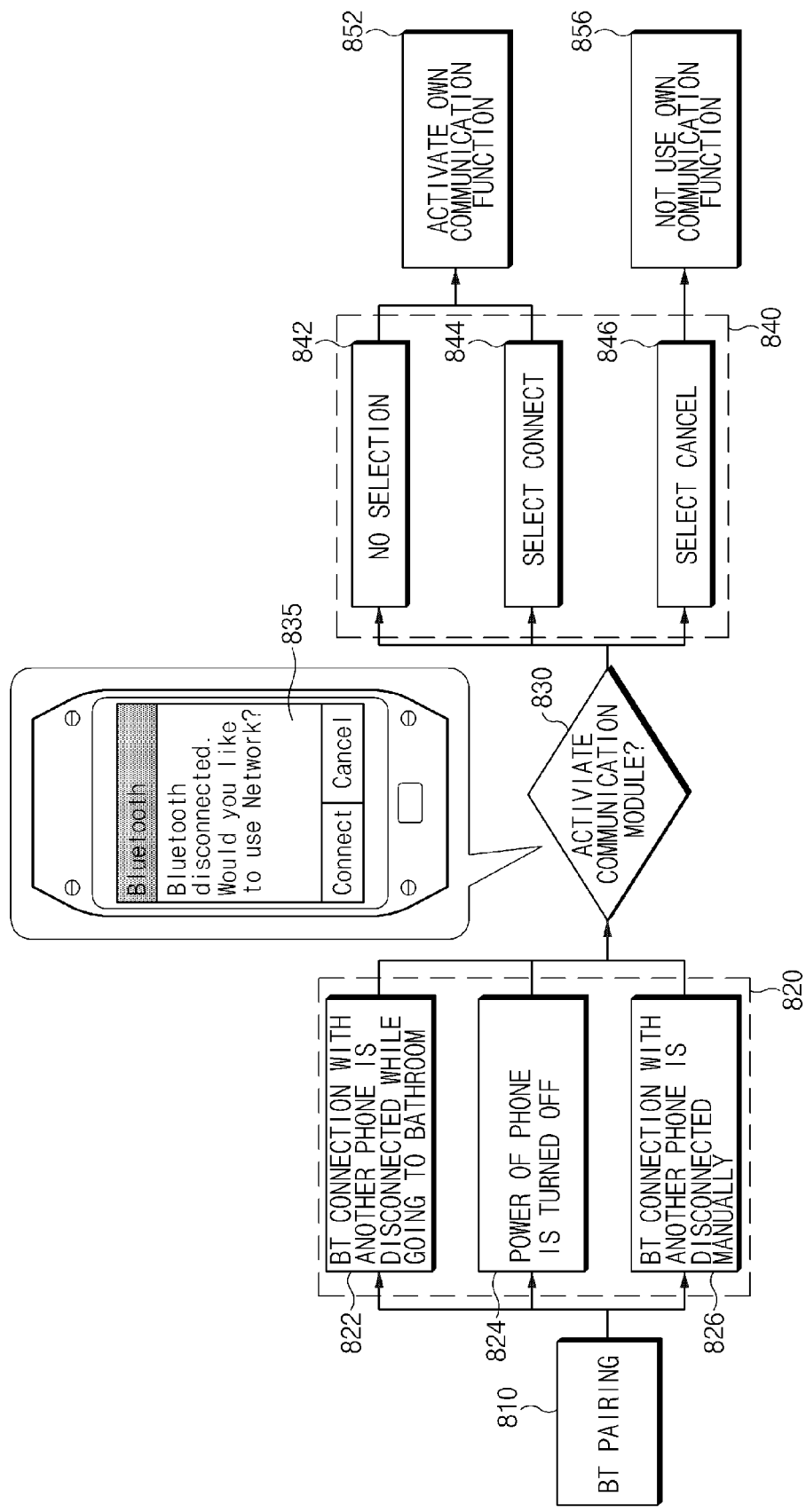
FIG. 8 is a flowchart illustrating a communication function activation method of a second electronic device according to various embodiments of the present disclosure.

FIG. 8 is a flowchart illustrating a communication function activation method of the second electronic device 420 according to various embodiments of the present disclosure. The communication function activation method of the second electronic device 420 according to an embodiment shown in FIG. 8 may include operations processed in a time series in the first electronic device 410, the second electronic device 420, the electronic device management server 430, the carrier 440, and the network 450 according to the various embodiments shown in FIGS. 1 to 7. Accordingly, even if there are contents omitted below, the contents described in relation to the first electronic device 420, the second electronic device 420, the electronic device management server 430, the carrier 440, and the network 450 of FIGS. 1 to 7 may be applied to the communication function activation method of the second electronic device 420 according to an embodiment shown in FIG. 8.

In operation 810, the second electronic device 420 may be paired with the first electronic device 410 through a BT network.

In operation 820, a BT pairing that mutually matches the second electronic device 420 and the first electronic device 410 may be released due to various causes. The release of the BT pairing will be described with the next example.

According to operation 822, a distance between the second electronic device 420 and a smartphone may become greater than a BT communicable distance. For example, when a user leaves the first electronic device 410 in a room and goes to a bathroom, the BT pairing between the second electronic device 420 and the first electronic device 410 may be released due to the distance created. According to operation 824, when power of the second electronic device 420 is switched off (e.g., by a user input turning off power, or battery exhaustion or depletion), the BT pairing between the second electronic device 420 and the first electronic device 410 may be released. According to operation 826, the BT pairing between the second electronic device 420 and the first electronic device 410 may be released by a user input directed releasing of the BT pairing.

In operation 830, the second electronic device 420 may display a communication module activation UI 835 on a screen for whether to activate the first communication module 422.

In operation 840, the second electronic device 420 may perform a predetermined operation by a user input through the communication module activation UI 835 or the satisfaction of a specified condition.

For example, according to operation 842 or operation 844, when the second electronic device 420 does not receive a selection input for a specified time, or receives a user input for activating the first communication module 422, as shown in operation 852, the second electronic device 420 may activate the first communication module 422.

On the other hand, according to operation 846, when the second electronic device 420 receives a user input for not activating the first communication module 422, as shown in operation 856, the second electronic device 420 may maintain the first communication module 422 to be in an inactivated state.

Figure 9:
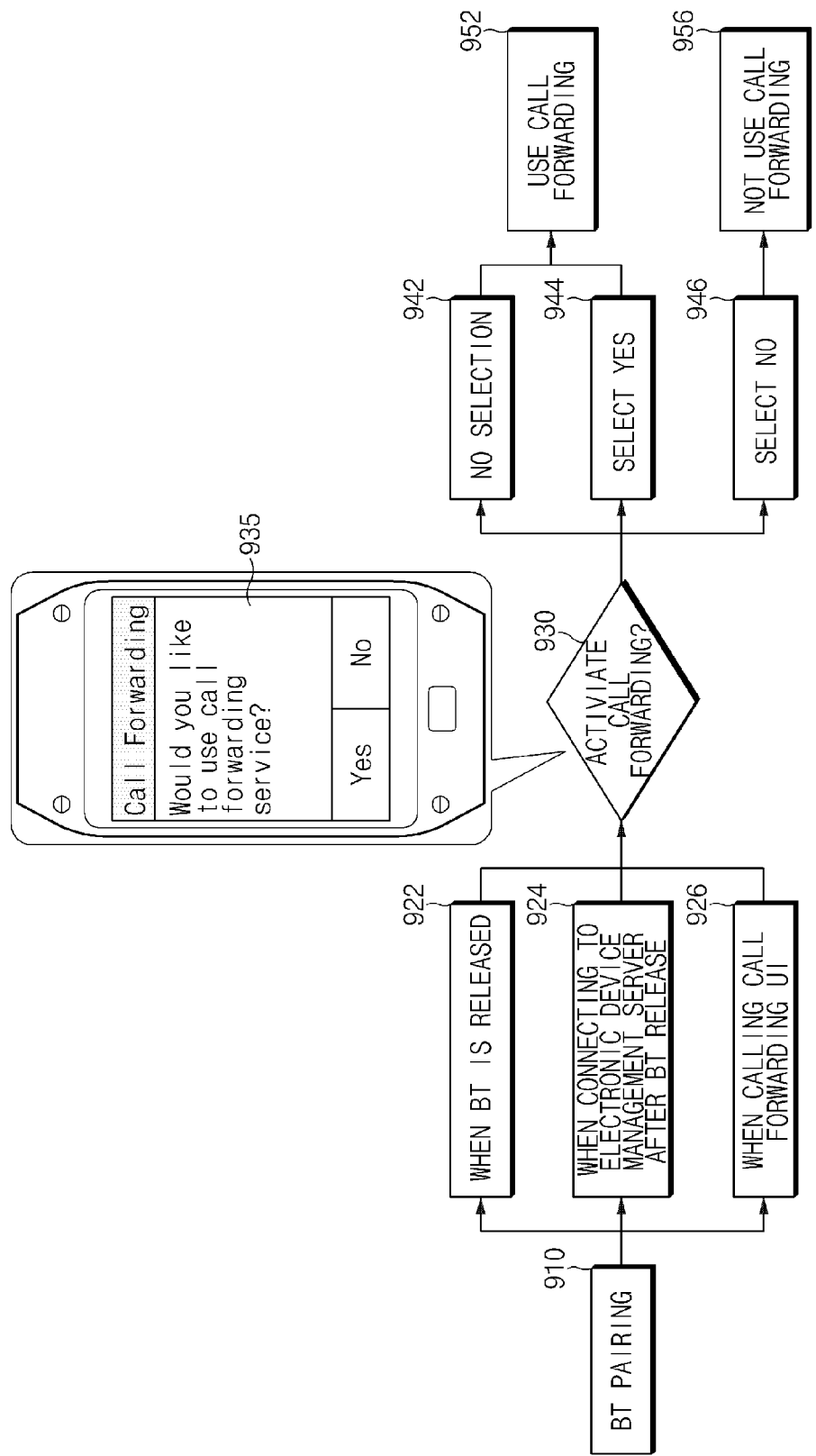
FIG. 9 is a flowchart illustrating a call forwarding service activation method according to various embodiments of the present disclosure.

FIG. 9 is a flowchart illustrating a call forwarding service activation method according to various embodiments of the present disclosure. The call forwarding service activation method to the second electronic device 420 according to an embodiment shown in FIG. 9 may include operations processed in time series in the first electronic device 410, the second electronic device 420, the electronic device management server 430, the carrier 440, and the network 450 according to the various embodiments shown in FIGS. 1 to 8. Accordingly, even if there are contents omitted below, the contents described in relation to the first electronic device 420, the second electronic device 420, the electronic device management server 430, the carrier 440, and the network 450 of FIGS. 1 to 8 may be applied to the call forwarding service activation method according to an embodiment shown in FIG. 9.

In operation 910, the second electronic device 420 may be paired with the first electronic device 410 through a BT network.

When a BT pairing mutually matching the second electronic device 420 and the first electronic device 410 is released in operation 922, the second electronic device 420 may display a call forwarding UI 935 (e.g., a user interface) on a screen for asking whether to use call forwarding service in operation 930.

Alternatively, when the second electronic device 420 is connected to the electronic device management server 430 in operation 924 after the BT pairing between the second electronic device 420 and the first electronic device 410 is released, the second electronic device 420 may display the call forwarding UI 935 in operation 930.

Alternatively, when receiving a user input for calling the call forwarding UI 935 in operation 926, the second electronic device 420 may display the call forwarding UI 935 in operation 930.

According to operation 942 or operation 944, when the second electronic device 420 does not receive an input for the call forwarding UI 935 for a specified time, or receives a user input for using call forwarding service, the second electronic device 420 may use the call forwarding service in operation 952.

On the other hand, according to operation 946, when the second electronic device 420 receives a user input for not using the call forwarding service, the second electronic device 420 may not use the call forwarding service in operation 956.

Hereinafter, with reference to FIGS. 10 and 11, according to a communication module activation or a call forwarding service use, an indicator displayed on each screen of the first electronic device 410 and the second electronic device 420 will be described.

Figure 10:
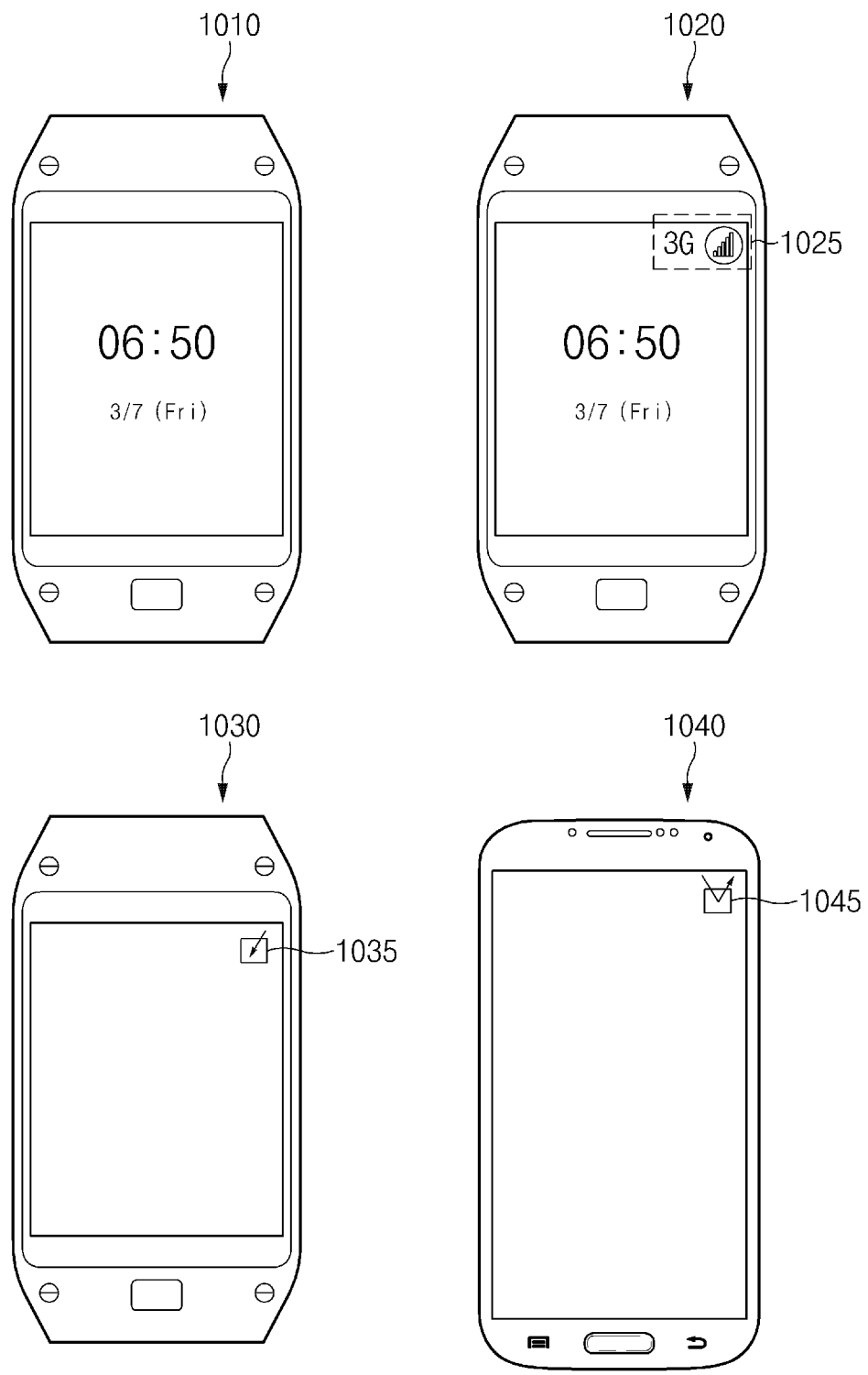
FIG. 10 is a view illustrating an indicator displayed on each screen of a first electronic device and a second electronic device according to various embodiments of the present disclosure.

FIG. 10 is a view illustrating an indicator displayed on each screen of the first electronic device 410 and the second electronic device 420 according to various embodiments of the present disclosure.

Referring to FIG. 10, the reference number 1010 represents the second electronic device 420 when the first communication module 422 is not activated and the reference number 1020 represents the second electronic device 420 when the first communication module 422 is activated.

When comparing the reference number 1010 and the reference number 1020, while the first communication module 422 of the second electronic device 420 is activated, a communication indicator 1025 indicating that the first communication module 422 is in an activated state may be displayed on the screen of the second electronic device 420. However, in this case, the "3G" indicator shown in the communication indicator 1025 is a mere example of a cellular communication mode used in the first communication module 422, and it is understood that various embodiments of the present disclosure are not limited to using only 3G as a cellular communication. The second electronic device 420 may use various communication functions, such as LTE or LTE-A. Additionally, the first communication module 422 uses the CS module 4220 and also the PS module 4225 and when data communication is used, an indicator for a corresponding communication may be displayed on the screen. Furthermore, an indicator (e.g., in antenna form) representing a communication throughput may be shown as the communication indicator 1025. It is understood, however, that this example also does not limit the various embodiments of the present disclosure.

The reference number 1030 shown at the bottom of FIG. 10 represents the second electronic device 420 using call forwarding service and in this case, a call forwarding indicator 1035 representing that the call forwarding service is in use may be displayed on the screen. Additionally, the reference number 1040 shown at the bottom of FIG. 10 represents the first electronic device 410 is using call forwarding service, and in this case, a call forwarding indicator 1045 representing that the call forwarding service is in use may be displayed on a screen.

Figure 11:
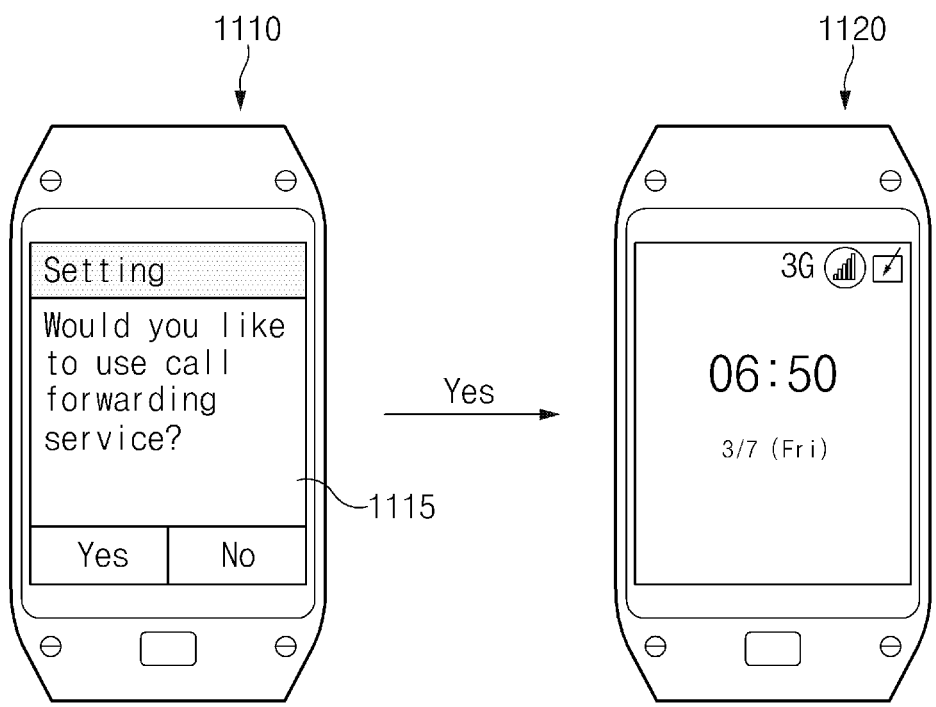
FIG. 11 is a view illustrating a method of setting call forwarding service to a communication module of a second electronic device and the second electronic device according to various embodiments of the present disclosure.

FIG. 11 is a view illustrating a method of activating the first communication module 422 of the second electronic device 420 and setting call forwarding service to the second electronic device 420 according to various embodiments of the present disclosure.

Although a communication module activation method and a call forwarding service are separately described above with reference to FIGS. 8 and 9, according to various embodiments of the present disclosure, the communication module activation method and the call forwarding service may be performed at the same time.

Referring to FIG. 11, the second electronic device 420 may display a call forwarding UI 1115 on a screen in operation 1110. The call forwarding UI 1115 may correspond to the call forwarding UI 935 shown in FIG. 9.

When "Yes" is selected from the call forwarding UI 1115, operation 1110 may proceed to operation 1120.

In operation 1120, the second electronic device 420 may activate the first communication module 422 and may utilize or establish the call forwarding service. Accordingly, a communication indicator and a call forwarding indicator may be displayed on the screen of the second electronic device 420, as depicted.

According to various embodiments of the present disclosure, when "connect" is selected from the communication module activation UI 835 shown in FIG. 8, the operation of FIG. 11 may be performed. In one example, a user confirms operation of a communication module, which allows activation of a communication module and establishment of the call forwarding service.

An electronic device according to various embodiments of the present disclosure may include a first communication module for performing cellular communication; a second communication module for performing communication to connect the electronic device to an external electronic device; and at least one processor electrically connected to the first and second communication modules, and the processor may transmit a signal for requesting call forwarding to the outside by using the first communication module on the basis of a specified condition.

According to various embodiments of the present disclosure, the first communication module may further perform data communication or WiFi communication using access point (AP) and the first communication module may access an electronic device management server by using the data communication or the WiFi.

According to various embodiments of the present disclosure, the second communication module may use a short range communication including at least one of BT, WiFi direct, ZigBee, NFC, and RFID.

According to various embodiments of the present disclosure, the specified condition for transmitting a signal for requesting the call forwarding to the outside by using the first communication module includes the case that a connection with the external electronic device is released; the case that the electronic device is connected to an electronic device management server through the first communication module; or the case that a user input for generating a signal for requesting the call forwarding is received through a call forwarding UI.

According to various embodiments of the present disclosure, the processor may display a call forwarding UI when a connection with the external electronic device is released, when the electronic device is connected to an electronic device management server through the first communication module, or when a user input for requesting a display of the call forwarding UI is received.

According to various embodiments of the present disclosure, when a connection with the external electronic device is released, the processor may request a connection with the electronic device from the electronic device management server by using the first communication module. According to various embodiments of the present disclosure, the signal for requesting the call forwarding may be transmitted to the external electronic device directly or through the electronic device management server and a signal for requesting the transmitted call forwarding may be transmitted to a specified carrier through the external electronic device.

According to various embodiments of the present disclosure, the processor may transmit a signal for requesting the call forwarding release to the outside by using the first communication module when it is connected to the external electronic device, when the electronic device is disconnected from an electronic device management server, or when a user input for generating a signal for requesting the release of the call forwarding is received through a call forwarding UI.

According to various embodiments of the present disclosure, a signal for requesting the call forwarding or a signal for requesting the release of the call forwarding may be in one format of a voice message, a text message, a multimedia message, a MAP message, and an USSD message.

According to various embodiments of the present disclosure, the first communication module may receive a message for notifying a communication disabled state of the external electronic device from an electronic device management server.

According to various embodiments of the present disclosure, the first communication module may receive information or message for a voice call not received during the communication disabled state from an electronic device management server, the external electronic device, or a carrier when the communication disabled state of the electronic device is eliminated. In this case, according to various embodiments of the present disclosure, the information on a not-received voice call or the message not received during the communication disabled state may be displayed in a summarized list format.

According to various embodiments of the present disclosure, the electronic device may be a wearable electronic device and the external electronic device may be a smartphone.

According to various embodiments of the present disclosure, the processor may activate the first communication module when a connection between the electronic device and the external electronic device is disconnected, when the electronic device is connected to an electronic device management server, or when a user input for requesting the activation of the first communication module through a first communication module activation UI.

According to various embodiments of the present disclosure, the first communication module includes a CS module and a PS module and an operation for activating the first communication module may be at least to activate the CS module. For example, when the electronic device is connected to the electronic device management server by using the PS module or the second communication module, the CS module in deactivated state may be activated.

According to various embodiments of the present disclosure, a sensor for detecting a human body may be further included and the processor may transmit a signal for requesting the call forwarding when a human body is detected.

According to various embodiments of the present disclosure, when the first communication module is in operation, the processor may display an indicator for notifying that the first communication module is in operation on a screen.

According to various embodiments of the present disclosure, during the use of call forwarding service, the processor 426 may display an indicator for notifying that the call forwarding service is in use on a screen.

According to various embodiments of the present disclosure, an electronic device includes a first communication module for performing cellular communication; and a second communication module for performing a communication to connect the electronic device to an external device, and the first communication module may receive a voice call signal or message using the electronic device as a reception device from a carrier while a connection between the electronic device and the external electronic device is maintained and may not receive a voice call signal or message targeting the electronic device as a reception device from a carrier after a connection between the electronic device and the external electronic device is disconnected.

According to various embodiments of the present disclosure, the first communication module may receive a signal for requesting call forwarding from the external electronic device and may transmit the received signal for requesting the call forwarding to the carrier.

According to various embodiments of the present disclosure, at least one processor electrically connected to the first and second communication modules may be further included and the processor may transmit a signal for requesting the release of call forwarding to the external device to the carrier by using the first communication module when the first communication module receives a communication disabled state notification of the external electronic device from an electronic device management server.

According to various embodiments of the present disclosure, during the use of call forwarding service, the processor may display an indicator for notifying that the call forwarding service is in use on a screen.

According to various embodiments of the present disclosure, the processor may display a call forwarding UI for controlling the call forwarding service on a screen on the basis of a user input.

According to various embodiments of the present disclosure, the electronic device may be a smartphone and the external electronic device may be a wearable electronic device.

According to various embodiments of the present disclosure, a call forwarding method of an electronic device includes detecting a specified operation and transmitting a signal for requesting call forwarding to a carrier. The specified operation includes the case that a connection with the external electronic device is released; the case that the electronic device is connected to an electronic device management server through the first communication module; or the case that a user input for generating a signal for requesting the call forwarding is received through a call forwarding UI.

According to various embodiments of the present disclosure, the method may further include receiving, by the electronic device instead of the external electronic device, a voice call signal or message targeting the external electronic device as a reception device from the carrier on the basis of the call forwarding request.

According to any one of the above-mentioned technical solutions of the present disclosure, at least one of various embodiments of the present disclosure may provide, by using a plurality of electronic devices, call forwarding service based on each state of the plurality of electronic devices.

The term "module" used in this disclosure, for example, may mean a unit including a combination of at least one of hardware, software, and firmware. The term "module" and the term "unit", "logic", "logical block", "component", or "circuit" may be interchangeably used. A "module" may be a minimum unit or part of an integrally configured component. A "module" may be a minimum unit performing at least one function or part thereof. A "module" may be implemented mechanically or electronically. For example, "module" used in this disclosure may include at least one of an application-specific integrated circuit (ASIC) chip performing certain operations, field-programmable gate arrays (FPGAs), or a programmable-logic device, all of which are known or to be developed in the future.

According to various embodiments, at least part of a device (for example, modules or functions thereof) or a method (for example, operations), for example, as in a form of a programming module, may be implemented using an instruction stored in computer-readable storage media. When at least one processor (for example, the processor 120) executes an instruction, it may perform a function corresponding to the instruction. The non-transitory computer-readable storage media may include the memory 130, for example.

The computer-readable storage media may include hard disks, floppy disks, magnetic media (for example, magnetic tapes), optical media (for example, Compact Disc Read Only Memory (CD-ROM), Digital Versatile Disc (DVD), and Magneto-Optical Media such (for example, floptical disk)), and hardware (for example, Read Only Memory (ROM), Random Access Memory (RAM), and flash memory). Additionally, a program instruction may include high-level language code executable by a computer using an interpreter in addition to machine code created by a compiler. The hardware device may be configured to operate as at least one software module to perform an operation of various embodiments and vice versa.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" may be hardware in the disclosure. Under the broadest reasonable interpretation, the appended claims are statutory subject matter in compliance with 35 U.S.C. §101.

A module or a programming module according to various embodiments may include at least one of the above-mentioned components, may not include some of the above-mentioned components, or may further include another component. Operations performed by a module, a programming module, or other components according to various embodiments may be executed through a sequential, parallel, repetitive or heuristic method. Additionally, some operations may be executed in a different order or may be omitted. Or, other operations may be added.

Also, embodiments disclosed in various embodiments of the present disclosure are suggested for the description and understanding of technical contents and are not limit the scope of the present disclosure. Accordingly, the scope of the present disclosure should be interpreted as including all modifications or various other embodiments based on the technical idea of the present disclosure.

What is claimed is:

1. An electronic device comprising:
   a first communication module configured to perform cellular communication with a communication carrier;
   a second communication module configured to communicatively connect the electronic device to an external electronic device; and
   at least one processor electrically connected to the first and second communication modules and configured to:
      activate the first communication module in response to detecting a preset condition, and
      transmit, via the first communication module, a signal to the communication carrier, the signal including a request that the communication carrier establish call forwarding for the external electronic device to the electronic device, wherein the preset condition includes a release of pairing between the electronic device and the external electronic device, such that the signal is transmitted to the communication carrier while the electronic device and the external electronic device are unpaired.

2. The electronic device according to claim 1, wherein the second communication module uses short range communication including at least one of Bluetooth, WiFi direct, ZigBee, Near Field communication (NFC), and Radio Frequency Identification (RFID).

3. The electronic device according to claim 1, wherein detecting the preset condition comprises at least one of:
   detecting disconnection of the external electronic device with the electronic device;
   detecting communicative connection to an electronic device management server through the first communication module; and
   detecting an input requesting call forwarding received through a call forwarding user interface (UI), the processor further configured to:
   in response to detecting the preset condition, displaying the call forwarding UI.

4. The electronic device according to claim 3, wherein the first communication module is further configured to perform at least one of data communication and WiFi communication using an access point (AP), and access the electronic device management server by using the at least one of the data communication and the WiFi communication.

5. The electronic device according to claim 3, wherein the first communication module comprises a circuit switching module and a packet switching module, and
   the circuit switching module is activated when the first communication module is activated.

6. The electronic device according to claim 5, wherein when the electronic device is connected to the electronic device management server via at least one of the packet switching module or the second communication module, the processor is further configured to activate the circuit switching module from a deactivated state.

7. The electronic device according to claim 1, wherein:
   the processor is further configured to access an electronic device management server using the first communication module when a connection with the external electronic device is disconnected;
   transmit the signal for requesting the call forwarding to the external electronic device directly or through the accessed electronic device management server; and
   wherein the signal requesting call forwarding is transmitted to the communication carrier by the external electronic device.

8. The electronic device according to claim 1, wherein in response to detecting at least one of:
   connection to the external electronic device, disconnection of the electronic device from an electronic device management server, and a user input generating a signal requesting a release of the call forwarding received through a call forwarding UI,
   the processor is further configured to transmit the signal requesting the release using the first communication module.

9. The electronic device according to claim 8, wherein the signal requesting call forwarding or the signal requesting the release has a format including at least one of a voice message, a text message, a multimedia message, a Mobile Application Part (MAP) message, and an Unstructured Supplementary Service Data (USSD) message.

10. The electronic device according to claim 1, wherein operations further including receive a message indicating a communication-disabled state of the external electronic device from an electronic device management server.

11. The electronic device according to claim 1, wherein when a communication state of the electronic device is restored from a communication disabled state, the first communication module is further configured to receive information for a missed voice call or missed message received during the communication disabled state from at least one of an electronic device management server, the external electronic device, and the communication carrier.

12. The electronic device according to claim 11, wherein the information for the missed voice call or missed message is displayed in a summarized list format on a screen of the electronic device.

13. The electronic device according to claim 1, wherein the electronic device is a wearable electronic device and the external electronic device is a smartphone.

14. The electronic device according to claim 1, further comprising:
   a sensor configured to detect a human body, wherein the signal requesting call forwarding is transmitted in response to detecting that a human body by the sensor.

15. The electronic device according to claim 1, further comprising a display unit, the at least one processor further configured to:
   display a call forwarding indicator on the display unit indicating that the requested call forwarding with the external electronic device is established,
   wherein the first communication module is further configured to notify a communication state of the electronic device to an electronic device management server utilizing a network ping.

16. An electronic device comprising:
   a first communication module configured to perform cellular communication with a communication carrier;
   a second communication module configured to communicatively connect the electronic device to an external electronic device; and
   at least one processor electrically connected to the first and second communication modules, and configured to:
   if the electronic device is communicatively connected to the external electronic device, receive, via the first communication module, a voice call signal or message for the electronic device from the communication carrier, and
   if the electronic device is communicatively disconnected from the external electronic device, the voice call signal or the message for the electronic device is transmitted to the external electronic device from the communication carrier.

17. The electronic device according to claim 16, further comprising a display unit, wherein processor is further configured to:
   in response to receiving a signal requesting call forwarding from the external electronic device, transmit the signal requesting call forwarding to the communication carrier to establish call forwarding to the external electronic device,
   wherein a call forwarding indicator is displayed on the display unit to indicate that the requested call forwarding to the external electronic device is established.

18. The electronic device according to claim 16, wherein the processor is further configured to:
   in response to receiving a notification indicating that the external electronic device is disconnected from an electronic device management server, transmit a signal requesting release of call forwarding to the communication carrier.

19. The electronic device according to claim 16, wherein the electronic device is a smartphone and the external electronic device is a wearable electronic device.

20. A call forwarding method for an electronic device, comprising:
- detecting, by a processor, a preset condition including at least one of:
  - disconnection of the electronic device with an external electronic device, and
  - connection between the electronic device with an electronic management server; and
- in response to detecting the preset condition, transmitting a signal via cellular communication to a communication carrier including a requesting that the communication carrier establish call forwarding for the external electronic device to the electronic device, wherein the preset condition includes a release of pairing between the electronic device and the external electronic device, such that the signal is transmitted to the communication carrier while the electronic device and the external electronic device are unpaired.

* * * * *

UNITED STATES PATENT AND TRADEMARK OFFICE
CERTIFICATE OF CORRECTION

| | | |
|---|---|---|
| PATENT NO. | : 9,571,658 B2 | Page 1 of 1 |
| APPLICATION NO. | : 14/663623 | |
| DATED | : February 14, 2017 | |
| INVENTOR(S) | : Yong Ju Yu et al. | |

It is certified that error appears in the above-identified patent and that said Letters Patent is hereby corrected as shown below:

In the Claims

Column 37, Claim 20, Line 17 should read as follows:
--... including a request that the communication...--

Signed and Sealed this
Eighth Day of August, 2017

Joseph Matal
*Performing the Functions and Duties of the*
*Under Secretary of Commerce for Intellectual Property and*
*Director of the United States Patent and Trademark Office*